United States Patent
Zaring et al.

(10) Patent No.: US 7,379,886 B1
(45) Date of Patent: May 27, 2008

(54) CELLULAR TELEPHONE INTERACTIVE WAGERING SYSTEM

(75) Inventors: Jon C. Zaring, Glenpool, OK (US); Kevin D. Satterfield, Tulsa, OK (US); Connie T. Marshall, Muskogee, OK (US)

(73) Assignee: ODS Properties, Inc., Los Angeles, CA (US)

( * ) Notice: Subject to any disclaimer, the term of this patent is extended or adjusted under 35 U.S.C. 154(b) by 0 days.

(21) Appl. No.: 09/516,736

(22) Filed: Mar. 1, 2000

(51) Int. Cl.
G06Q 10/00 (2006.01)
G06Q 99/00 (2006.01)
A63F 9/24 (2006.01)
G06F 19/00 (2006.01)

(52) U.S. Cl. .................... 705/5; 705/1; 463/25; 700/93
(58) Field of Classification Search .................. 463/40; 45/412; 705/1, 25, 37, 500, 5
See application file for complete search history.

(56) References Cited

U.S. PATENT DOCUMENTS

| | | | |
|---|---|---|---|
| 4,704,725 A | 11/1987 | Harvey et al. .................. 380/9 |
| 4,706,121 A | 11/1987 | Young .......................... 358/142 |
| 4,799,683 A | 1/1989 | Bruner, Jr. ............. 273/138 A |
| 5,083,271 A | 1/1992 | Thacher et al. ............. 364/411 |
| 5,083,800 A | 1/1992 | Lockton ...................... 273/439 |
| 5,227,874 A | 7/1993 | Von Kohorn ................. 358/84 |
| 5,233,654 A | 8/1993 | Harvey et al. ................ 380/20 |
| 5,249,044 A | 9/1993 | Von Kohorn ................. 358/86 |
| 5,408,417 A | 4/1995 | Wilder ........................ 364/479 |
| 5,415,416 A | 5/1995 | Scagnelli et al. ........... 273/439 |
| 5,564,977 A | 10/1996 | Algie .......................... 463/25 |
| 5,830,068 A | 11/1998 | Brenner et al. ............... 463/42 |
| 5,999,808 A * | 12/1999 | LaDue ....................... 455/412 |
| 6,004,211 A | 12/1999 | Brenner et al. ............... 463/40 |
| 6,099,409 A * | 8/2000 | Brenner et al. ............... 463/40 |
| 6,421,536 B1 * | 7/2002 | Uranaka et al. ............ 455/417 |

FOREIGN PATENT DOCUMENTS

| | | |
|---|---|---|
| EP | 0 387 046 A2 | 9/1990 |
| EP | 0 583 196 A1 | 2/1994 |
| EP | 0 620 688 A2 | 10/1994 |

(Continued)

OTHER PUBLICATIONS

The Boulder County Business Report; Feb. 1998; By Beth Potter; Horse racing network bets on interactive TV.*

(Continued)

*Primary Examiner*—John W. Hayes
*Assistant Examiner*—Rutao Wu
(74) *Attorney, Agent, or Firm*—Brian E. Mack; Ropes & Gray LLP

(57) ABSTRACT

Systems and processes for interactive wagering are provided. A cellular telephone or handheld computing device may be used to access an interactive wagering service. Television equipment and computer equipment may be used to access the service. A user may view information on wagers such as current odds and other racing data for horses or other runners on the cellular telephone or other device. The user may create a corresponding off-track wager with the cellular telephone or other device that may be sent to a transaction processing and subscription management system. The transaction processing and subscription management system may handle the wager transaction and adjust the user's account balance.

71 Claims, 21 Drawing Sheets

FOREIGN PATENT DOCUMENTS

| | | |
|---|---|---|
| EP | 0 624 039 A2 | 11/1994 |
| EP | 0 673 004 A2 | 9/1995 |
| EP | 0 873 772 A1 | 10/1998 |
| EP | 0 934 765 A1 | 8/1999 |
| GB | 2 300 535 A | 11/1996 |
| JP | 01-25659 | 1/1989 |
| JP | 01-269157 | 10/1989 |
| JP | 02-110660 | 4/1990 |
| JP | 02-231671 | 9/1990 |
| JP | 06-325062 | 11/1994 |
| JP | 11-175637 | 2/1999 |
| WO | WO008101664 * | 6/1981 |
| WO | WO9419906 A1 * | 3/1994 |
| WO | WO95/01058 | 1/1995 |
| WO | WO95/30944 | 11/1995 |
| WO | WO97/19428 | 5/1997 |
| WO | WO 01/03088 A1 | 1/2001 |

OTHER PUBLICATIONS

MOGID: Mobile Geo-depended Information on Demand, Dr Peter Balsiger, http://www.w3.org/Mobile/posdep/wap-v2.htm, Apr. 14, 2006.

"MOGID: Mobile Geo-depended Information on Demand," Dr Peter Balsiger, http://www.w3.org/Mobile/posdep/wap-v2.htm, Feb. 2-3, 2000.*

John Burgess, "And We're Off To The Races!" Jan. 16, 1995, pp. 18-19, The Washington Post.

Maury Wolff, "Interactive Wagering A Good Bet," Jan. 29, 1995, p. 4, Daily Racing Form.

Ross Peddicord, "New On TV: You Bet Your Horse," Dec. 15, 1994, The Sun, Baltimore, Maryland.

Yee-Hsiang Chang et al., "An Open-Systems Approach To Video On Demand," May 1994, pp. 68-80, IEEE Communications Magazine.

TrackMaster User's Guide Version 2.0.7, Apr. 1994, pp. 1-122, AXCIS Pocket Information Network, In., Santa Clara, California.

Tiny Tim Brochure, AutoTot Systems Inc., Newark, Delaware, undated.

Probe XL Brochure, pp. 1-21, AutoTote Systems, Inc., Newark, Delaware, undated.

Nokia 5190 Owner's Manual, pp. 1-87, Jun. 1998, Nokia Inc. (as printed from the Internet Oct. 12, 1999).

* cited by examiner

CELLULAR TELEPHONE INTERACTIVE WAGERING SYSTEM

BACKGROUND OF THE INVENTION

This invention relates to interactive wagering, and more particularly, to interactive wagering using cellular telephones and handheld computing devices.

Wagering is a popular leisure activity. For example, many racing fans wager on events such as horse, dog, and harness racing. However, it may be inconvenient to attend racing events in person. Not all racing fans have sufficient time to visit racetracks as often as they would like and some fans have difficulties in obtaining suitable transportation to the track. Off-track betting establishments are available for fans who cannot attend racing events in person, but fans must still travel to the off-track betting establishments.

As a result, systems have been developed in which fans may place off-track wagers using personal computers connected to the Internet, standard telephones, or set-top boxes. These systems are generally satisfactory, but are sometimes not as portable or as easily accessible as desired.

It is therefore an object of the present invention to provide an interactive wagering system that allows users to place wagers or view race results or the like using cellular telephones or handheld computing devices.

SUMMARY OF THE INVENTION

This and other objects of the invention are accomplished in accordance with the principles of the present invention by providing an interactive wagering system that allows users to access an interactive wagering service using a cellular telephone or handheld computing device. If desired, the interactive wagering service may be accessed using equipment such as non-cellular telephones, personal computers, and user television equipment (e.g., equipment based on set-top boxes). Users may interact with the wagering service using one platform to perform one function and a second platform to perform another function. For example, users may place wagers by submitting wagering data using one platform and may view race results using another platform.

The cellular telephone may have a display on which options may be displayed for various interactive wagering service functions. For example, options may be displayed that allow the user to access handicapping information, race results, and current odds and other racing data. Options may also be displayed that allow the user to place wagers by, e.g., selecting a desired racetrack, race, horse (or other runner), wager type (win, place, show, exacta, trifecta, etc.), wager amount, etc.

If desired, options may be displayed on the cellular telephone that facilitate the setting of reminders. A user may be reminded of an upcoming race of interest such as a race on which the user has placed a wager. When the race is just about to begin, the user may be alerted to the race by a telephone call, an audible tone, a visual reminder such as a visual reminder message displayed on the cellular telephone display, an e-mail message, paging message, or other alphanumeric message sent to the cellular telephone, etc. A reminder may be provided to the user by placing a telephone call to the user with automatic dialing equipment and providing an audio reminder message. Reminders may also be provided to other platforms supported by the system. For example, reminders may be provided to users at user television equipment (e.g., television equipment based on set-top boxes or the like), user computer equipment (e.g., a personal computer connected to the Internet), etc.

A transaction processing and subscription management system may be provided to handle wagers and users' accounts. Cellular telephones or handheld computing devices may communicate with the transaction processing and subscription management system using wireless communications. The transaction processing and subscription management system may receive racing data such as handicapping information and current racing information from a racing data collection and processing system. The transaction processing and subscription management system may interact with totalisators to handle wagers and information on current odds and the like. Videos related to races and the like may be distributed to the user in real-time or on demand.

Other interactive wagering service features may be provided using the cellular telephone or handheld computing device if desired, such as advertising, product purchasing, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
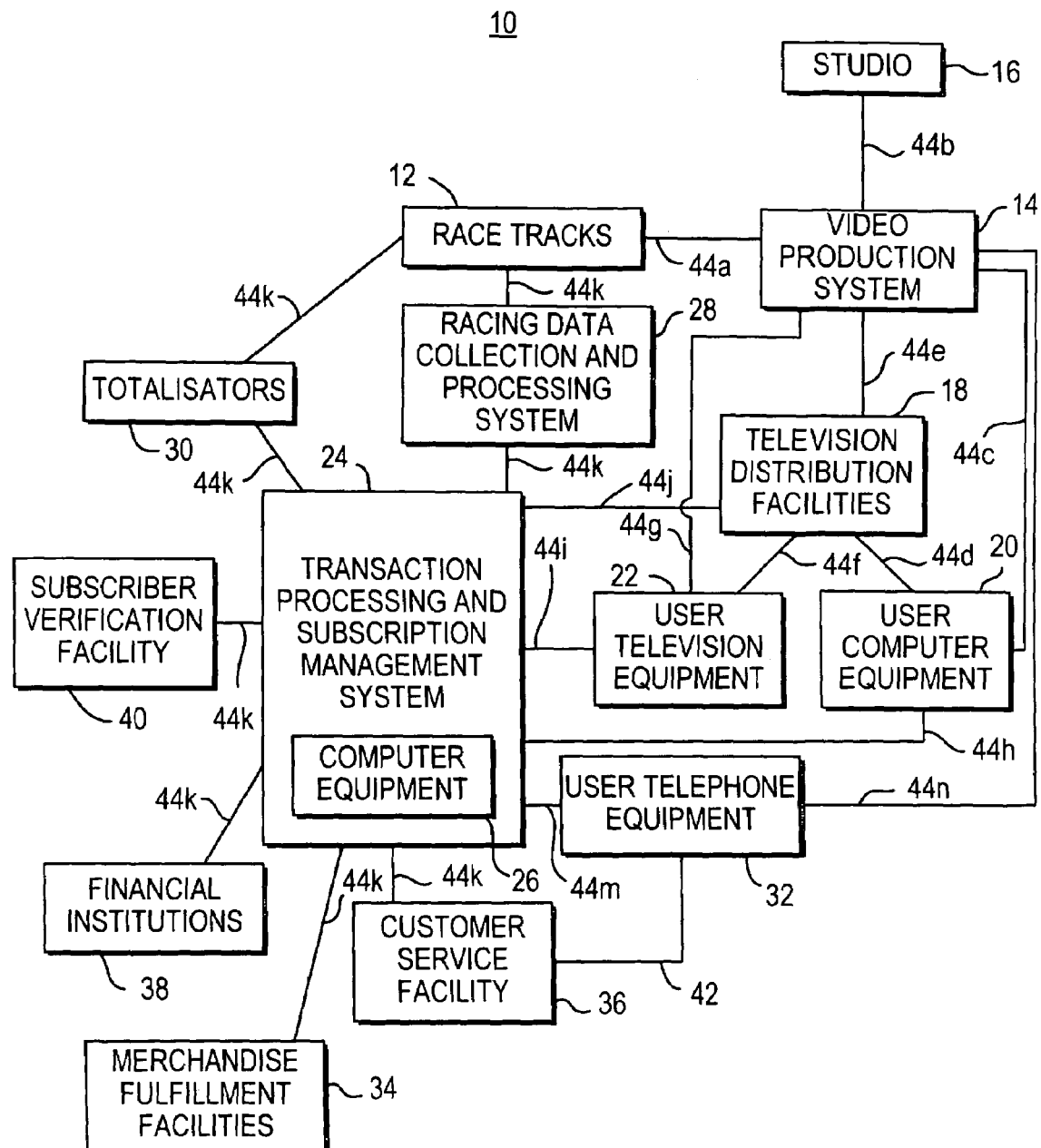
FIG. 1 is a schematic diagram of an illustrative interactive wagering system in accordance with the present invention.

An Illustrative Interactive Wagering System 10 in accordance with the present invention is shown in FIG. 1. Aspects of the invention apply to various different types of wagering, but are described herein primarily in the context of interactive wagering on races (e.g., horse races) for specificity and clarity. Races may be run at racetracks 12, which may be located at various geographic locations. Races run at the racetracks may be simulcast to television viewers. For example, simulcast videos may be provided to users with satellite receivers or to off-track betting establishments via satellite.

Real-time videos from racetracks 12 may also be provided to video production system 14 for distribution to users as part of a television wagering service (i.e., a wagering-related television channel or Internet-delivered service or the like). If desired, multiple simulcast videos may be provided to video production system 14 in real-time. Talent (e.g., commentators) for the television wagering service may be located at studio 16. Studio 16 may provide a video feed containing commentary and the like to video production system 14. Graphic overlays for the television wagering service may be added to the service at video production system 14.

The television wagering service may be provided by using video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 18 by a cable path. A digital set-top box may be used to receive the television wagering service on a digital channel. If desired, user television equipment 22 may contain a satellite receiver, a WebTV box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or an interactive wagering service. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction Processing and Subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system 24 if desired.

Transaction Processing and Subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Users who wish to place wagers may establish an account at transaction processing and subscription management system 24. An account may also be established at one of totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 24. Such financial functions may also be implemented primarily at a totalisator 30 or primarily at the transaction processing and subscription management system 24 if desired.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to specify the type of wager in which the user is interested and the desired wager amount. With a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The components of system 10 may be interconnected using various communications paths 44.

Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions, etc. Communications may involve one-way or two-way wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video.

For example, if it is desired to transmit high-quality simulcasts of races from racetracks 12 to video production system 14, analog or digital videos may be transmitted from racetracks 12 to video production system 14 over path 44a using satellite links. Video may be transmitted from studio 16 to video production system 14 over path 44b using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 14c using a modem link (using, for example, a digital subscriber line, a telephone network link, a wireless link etc.) The modem link may be made over a private network.

A user with a cable modem may connect a personal computer or other such user computer equipment 20 to an associated cable system headend using path 44d. (The headend in such an arrangement would be one of the television distribution facilities 18 shown in FIG. 1.) The user may then receive videos from the headend via cable modem. Videos may be provided to the headend over path 44e using a network link, fiber optic links, cable links, microwave links, satellite links, etc. A user with a set-top box or similar device (shown in FIG. 1 as user television equipment 22) may also receive videos from a cable system headend using a cable modem or other such communications device over path 44f. In addition, a user with user television equipment may receive videos over the Internet or a private network using a telephone-based modem or other such communications device using path 44g. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44f and 44d). For example, videos may be received as part of a dedicated interactive wagering service television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44n.

If desired, racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44h using a modem link. Path 44h may be a private network path or an Internet path. Path 44h may use telephone lines, digital subscriber lines, ISDN lines, wireless data paths, or any other suitable type of communications links. User television equipment 22 may receive data for the wagering service over communications path 44i, which may be a telephone line, digital subscriber line, ISDN line, or other suitable type of communications path and which may use a private network path or an Internet path, etc.

Data for the wagering service may be provided to users via communications path 44j and paths 44f and 44d. Communications path 44j may be provided over a private network, using the public telephone network, using satellite links, or any other suitable type of links. Data from paths such as path 44j may be routed to paths such as paths 44f and 44d directly by associated television distribution facilities 18, or may be buffered at television distribution facilities 18 if desired. Paths 44f and 44d may include coaxial cable and use of paths 44f and 44d may involve the use of cable modems or the like. If data is provided over path 44j and path 44f or path 44d using an Internet protocol, a web browser or similar application running on user television equipment 22 or user computer equipment 20 may be used to access the data. Such application software may also be used to view videos and may be used on other platforms (e.g., advanced cellular telephones) if desired.

The communications paths 44k that are used to connect various other components of the system typically do not carry high-bandwidth video signals. Accordingly, paths 44k may be telephone-like paths that are part of the Internet or a private network. Such paths and various other paths 44 may be dedicated connections for security, reliability, and economy.

User telephone equipment 32 may receive information for the wagering service via path 44m. If user telephone equipment 32 is a standard (non-cellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44m. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touch-tone signals that may be recognized by the interactive voice response system at transaction processing and subscription management system 24, or using any other suitable arrangement). These approaches may be used even if the user receives racing data and other information for the service using a platform other than a telephone-based platform.

If desired, the return communications path between the user and the interactive wagering service may use paging transmissions. For example, a cellular telephone or other handheld device with two-way paging capabilities may be used to place wagers and otherwise interact with the interactive wagering service using paging transmissions.

Users with user television equipment 22 may interact with the service by sending data (e.g., wager data) to transaction processing and subscription management system 24 using path 44i or using paths 44f and 44j. Users with user computer equipment 20 may send data (e.g., wager data) to transaction processing and subscription management system 24 via path 44h or paths 44d and 44j. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44j and 44f, whereas data may be sent by the user from user television equipment 22 to transaction processing and subscription management system 24 using path 44i, etc. Moreover, the paths used to receive certain video information may be different from those used to receive racing data. For example, user television equipment 22 may receive racing videos using path 44f, but may receive racing data using path 44i. These examples are merely illustrative. Any suitable combination of paths may be used to distribute racing data and other information for the interactive wagering service, any suitable combination of paths may be used to receive videos, and any suitable combination of paths may be used to send data to the wagering service.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports cellular telephone wagering or wagering using handheld computer devices. If desired, system 10 may be configured so that it does not support personal computer wagering, wagering with standard telephones, or wagering with user television equipment. The system may support cellular telephones and/or handheld computing devices such as personal digital assistants, palm-sized computers, etc. in combination with any other suitable platform.

Figure 2:
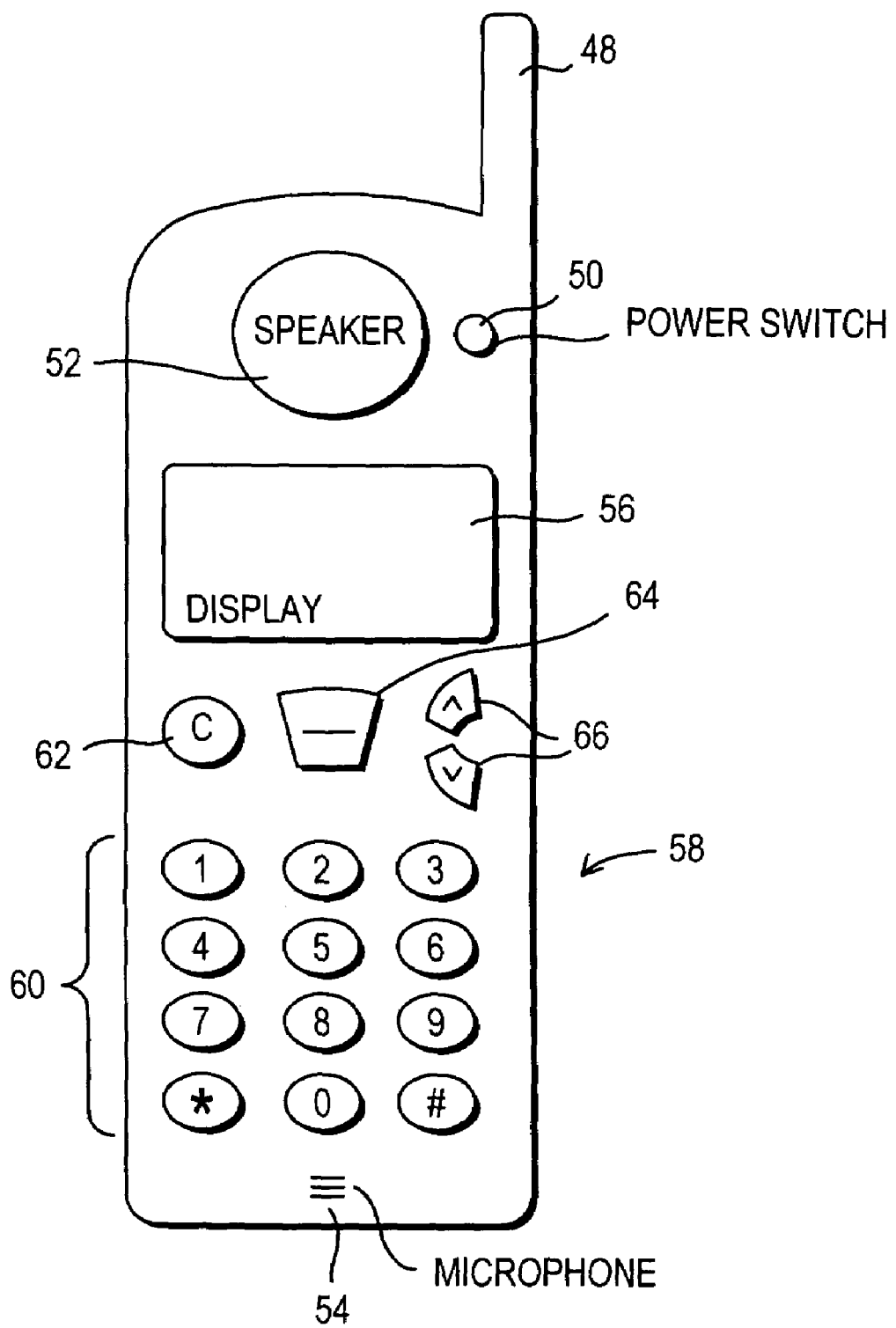
FIG. 2 is a diagram of an illustrative cellular telephone in accordance with the present invention.

An illustrative cellular telephone 46 with which the user may use the interactive wagering service is shown in FIG. 2. Software for the interactive wagering service may be used at transaction processing and subscription management system 24 and each of the other components shown in FIG. 1. A portion of the software that is used to implement the interactive wagering service is resident on cellular telephone 46. Cellular telephone 46 may have a memory for storing software instructions and a processor for executing those instructions. If desired, at least some of the interactive wagering features described herein may be implemented using a handheld computing device or personal digital assistant such as the Palm V or Palm VII devices of Palm Computing Inc. (a 3Com company) of Mountain View, Calif. instead of a cellular telephone. For clarity and simplicity, however, the invention will be described primarily in connection with cellular telephones.

Cellular telephone 46 may have an antenna 48 to support wireless communications with transaction processing and subscription management system 24. Communications between telephone 46 and system 24 may use communications path 44*m* of FIG. 1. Path 44*m* may include both a wireless portion (e.g., the link from cellular telephone 46 to a nearby antenna connected to the cellular network) and a non-wireless portion (e.g., non-wireless links in the public telephone network).

A power switch 50 (FIG. 2) may be used to turn on and off cellular telephone 46. A speaker 52 allows the user to hear conversations and to hear audio prompts from transaction processing and subscription management system 24. A microphone 54 allows the user to converse with others. Display 56 may be a liquid crystal display (black and white or color), a plasma display, a light-emitting diode display, an active matrix display, or any other suitable type of small display screen. Keys 58 allow the user to enter inputs. Numeric keys 60 (including the star and pound key) allow the user to respond to interactive voice response system prompts such as "press 3 to select race 3" and allow the user to enter numbers to select numerically identified on-screen menu options and the like that are displayed on display 56. If desired, some of the numeric keys 60 may perform secondary functions if, for example, they are pressed and held for at least a predetermined length of time. Clear key 62 may be used to clear characters from display 56. If the user presses and holds clear key 62, the user may be taken back to the initial screen displayed on display 56 upon power up. Navigation key 64 may be used to access menus, make telephone calls, etc. Scroll keys 66 may be used to scroll through menus and to scroll through other items presented on display screen 56.

Figure 3:
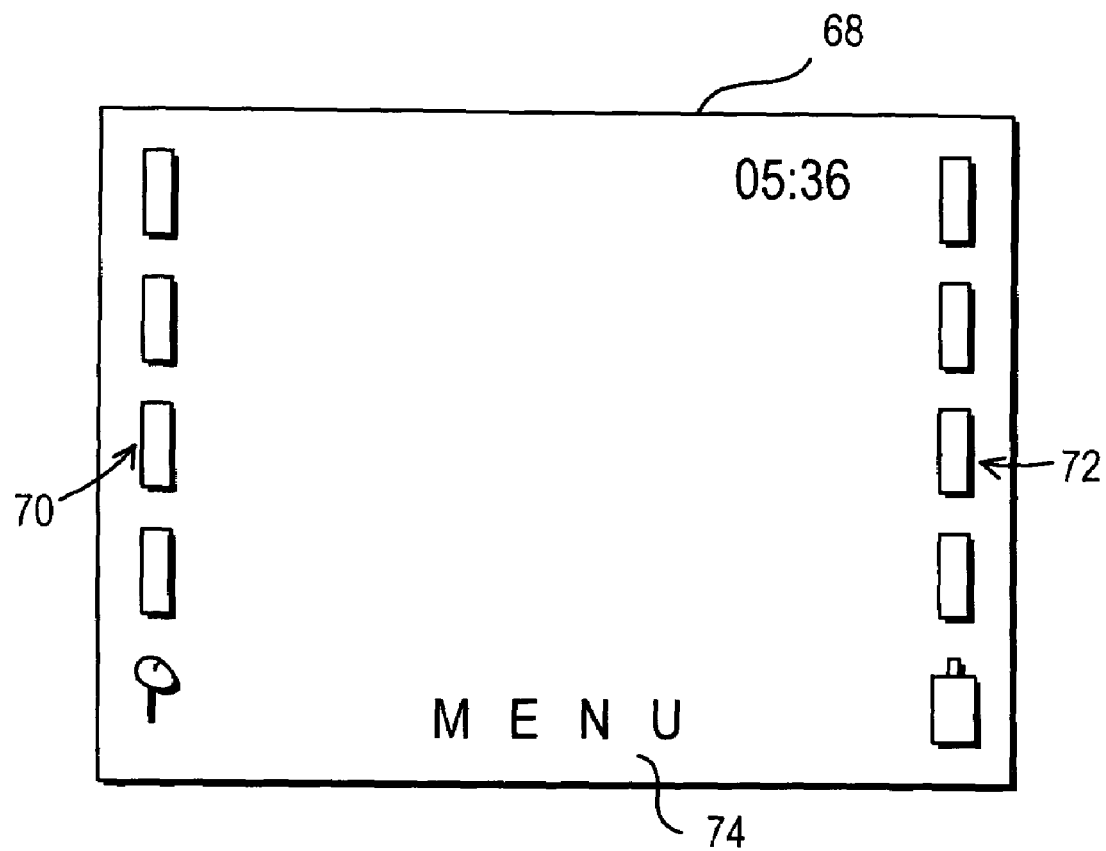
FIG. 3 is an illustrative initial menu screen that may be provided by the cellular telephone in accordance with the present invention.
Figure 4:
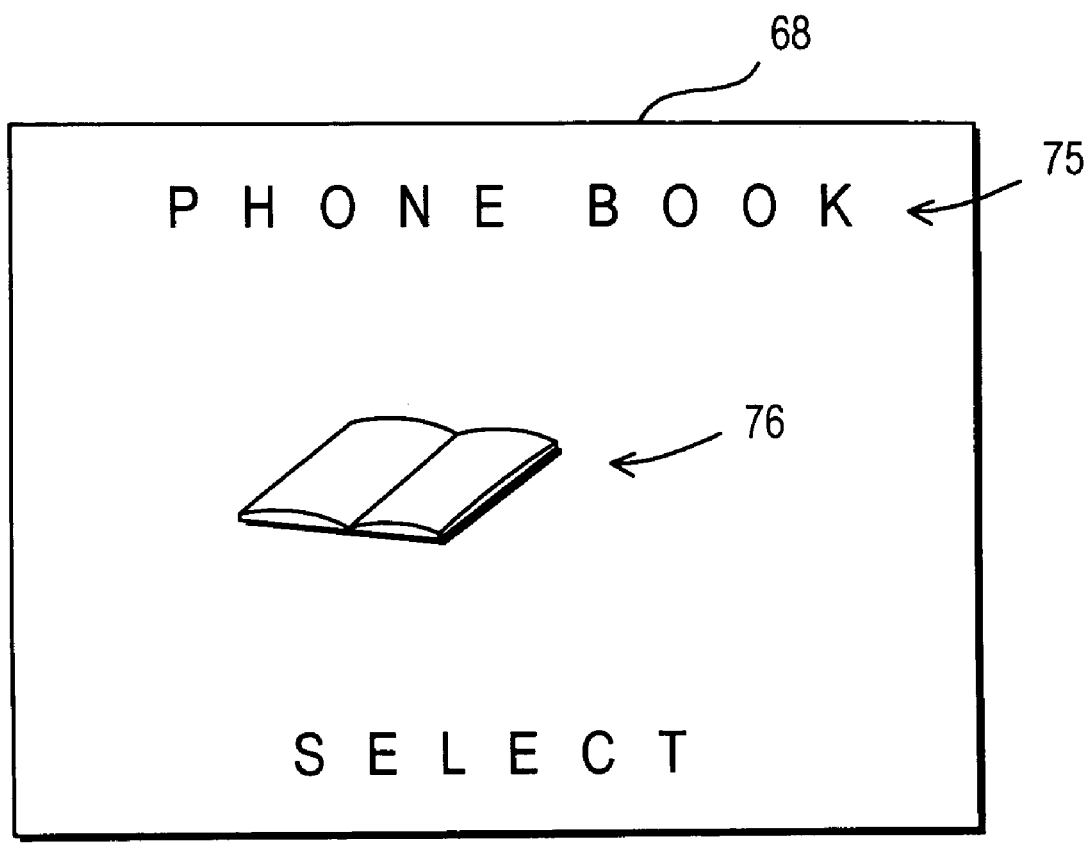
FIG. 4 is an illustrative screen that may be provided by the cellular telephone to provide access to a telephone book feature in accordance with the present invention.
Figure 5:
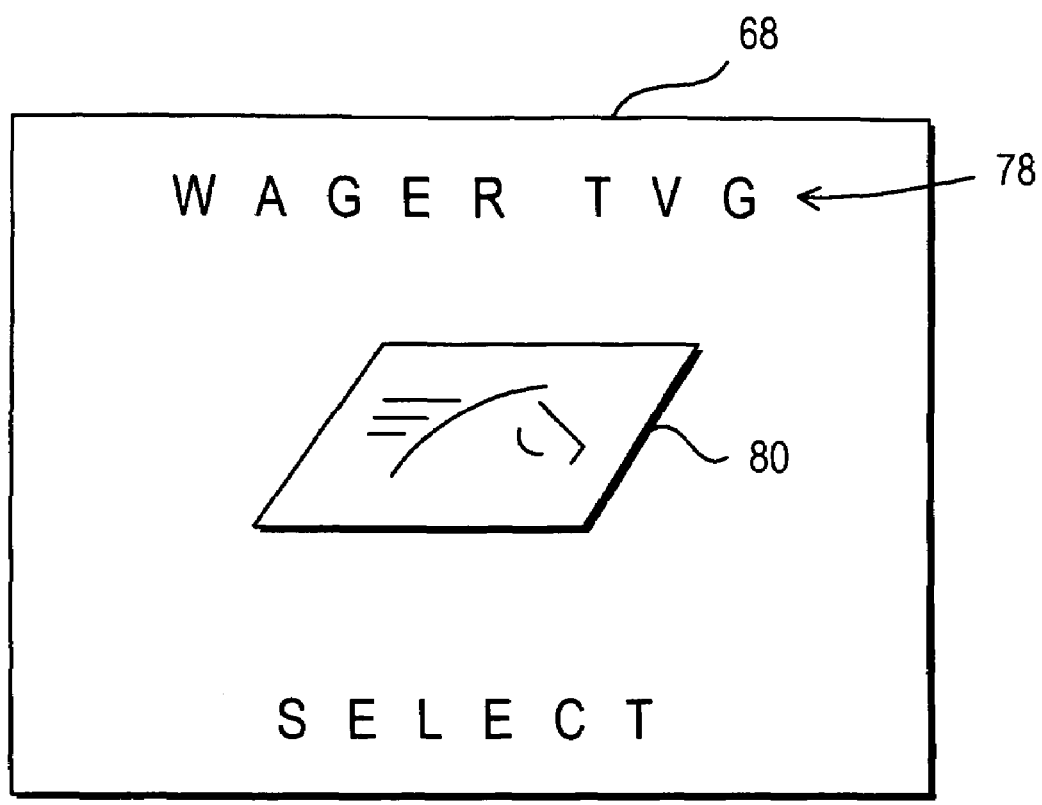
FIG. 5 is an illustrative screen that may be provided by the cellular telephone to provide access to an interactive wagering service in accordance with the present invention.

As shown in FIG. 3, when cellular telephone 46 is initially turned on, a screen 68 having a signal strength indicator 70 and a battery level indicator 72 may be presented to the user on display 56 (FIG. 2). Screen 68 of FIG. 3 may be provided with "MENU" label 74. Pressing the down scroll key 66 (FIG. 2) directs cellular telephone 46 (FIG. 2) to display screen 68 of FIG. 4, which includes a menu option label 75 and corresponding icon 76 for a phone book service. As shown in FIG. 5, if the user subsequently presses down scroll key 66, the cellular telephone 46 may display a screen containing the name 78 and logo 80 of a television wagering service or the like. If the user selects this option (e.g., by pressing navigation key 64 of FIG. 2), the user may be presented with a menu, such as the menu of screen 68 of FIG. 6.

Figure 6:
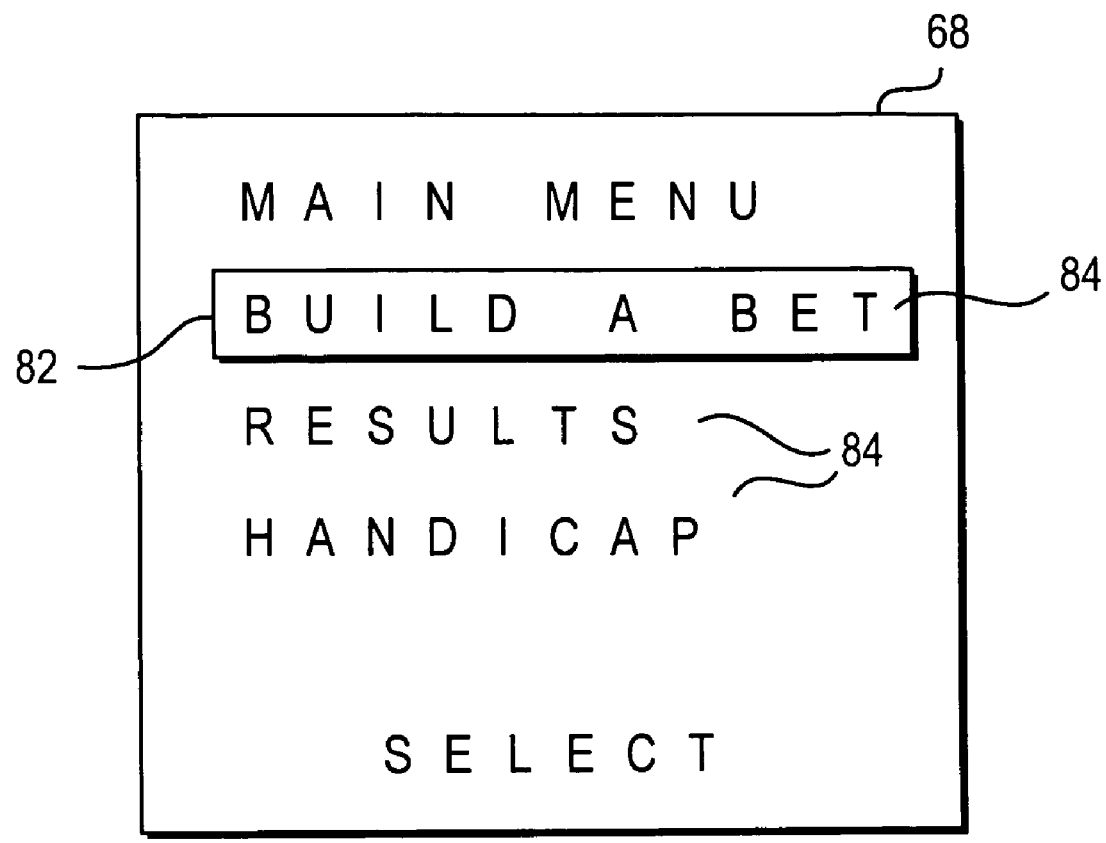
FIG. 6 is an illustrative main menu screen that may be provided by the interactive wagering service using the cellular telephone in accordance with the present invention.

As shown in FIG. 6, telephone 46 may provide the user with an opportunity to select a desired menu item by moving highlight region 82 with scroll keys 66 (FIG. 2). Pressing the up scroll key 66 directs the telephone to scroll upwards through the menu items 84. Pressing the down scroll key directs the telephone to scroll downwards through menu items 84. When the user has highlighted a desired menu item 84 ("build a bet" in the example of FIG. 6), the user may select that item by pressing navigation key 64 (for example).

The menu of FIG. 6, which is entitled "main menu," illustrates how the user may be provided with an opportunity to select from an option to generate wagers ("build a bet"), an option to view race results ("results"), and a menu option to access handicapping information (handicap). These options are illustrative. Any suitable options may be used to provide the user with additional ways in which to use the interactive wagering service.

Figure 7:
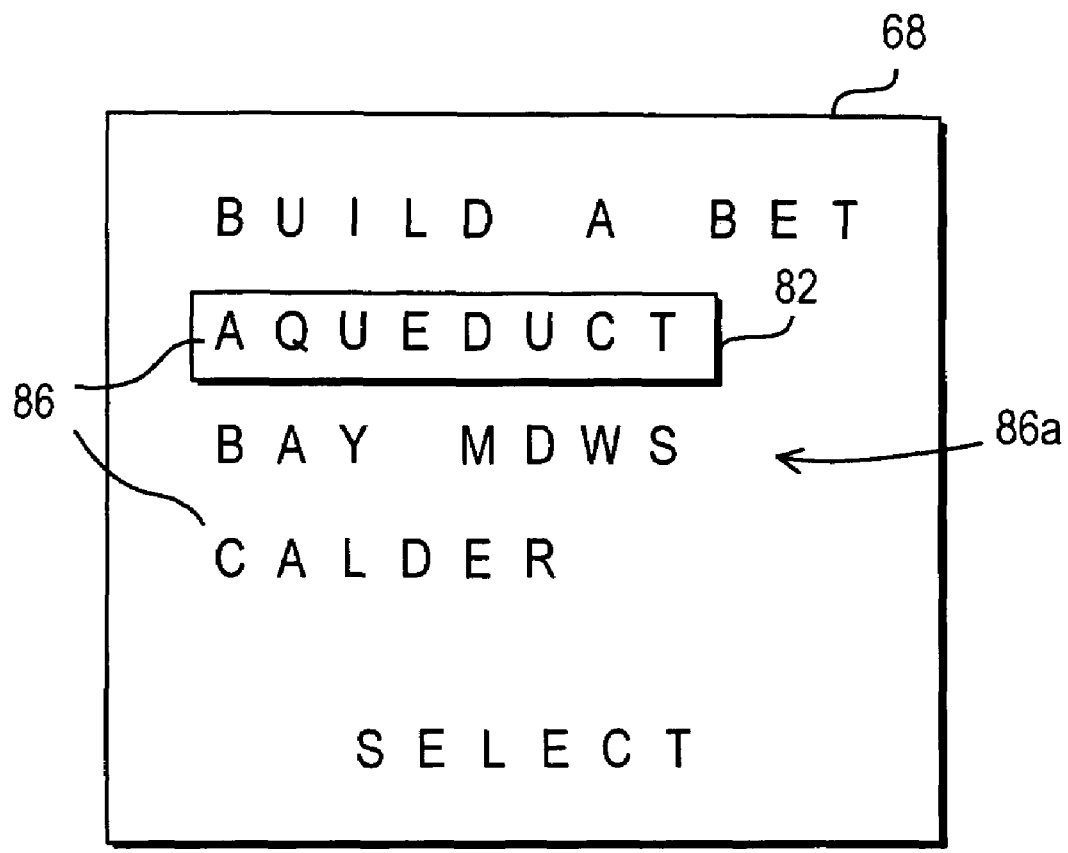
FIG. 7 is an illustrative racetrack selection screen that may be provided by the cellular telephone in accordance with the present invention.

If the user selects the build a bet option, the telephone may present the user with screen 68 of FIG. 7 (entitled "build a bet"). Screen 68 of FIG. 7 provides the user with an opportunity to select a track of interest. FIG. 7 shows how the user may use highlight region 82 to select from tracks 86. Track name 86*a* ("Bay Mdws.") is abbreviated, because the unabbreviated track name ("Bay Meadows") is too large to fit in screen 68 (in this illustrative example). Track names such as track name 86*a* may be abbreviated using a locally-implemented abbreviation routine. If desired, abbreviated track names may be stored by transaction processing and subscriber management system 24 or other suitable system and provided to cellular telephone 46 when needed.

Figure 8:
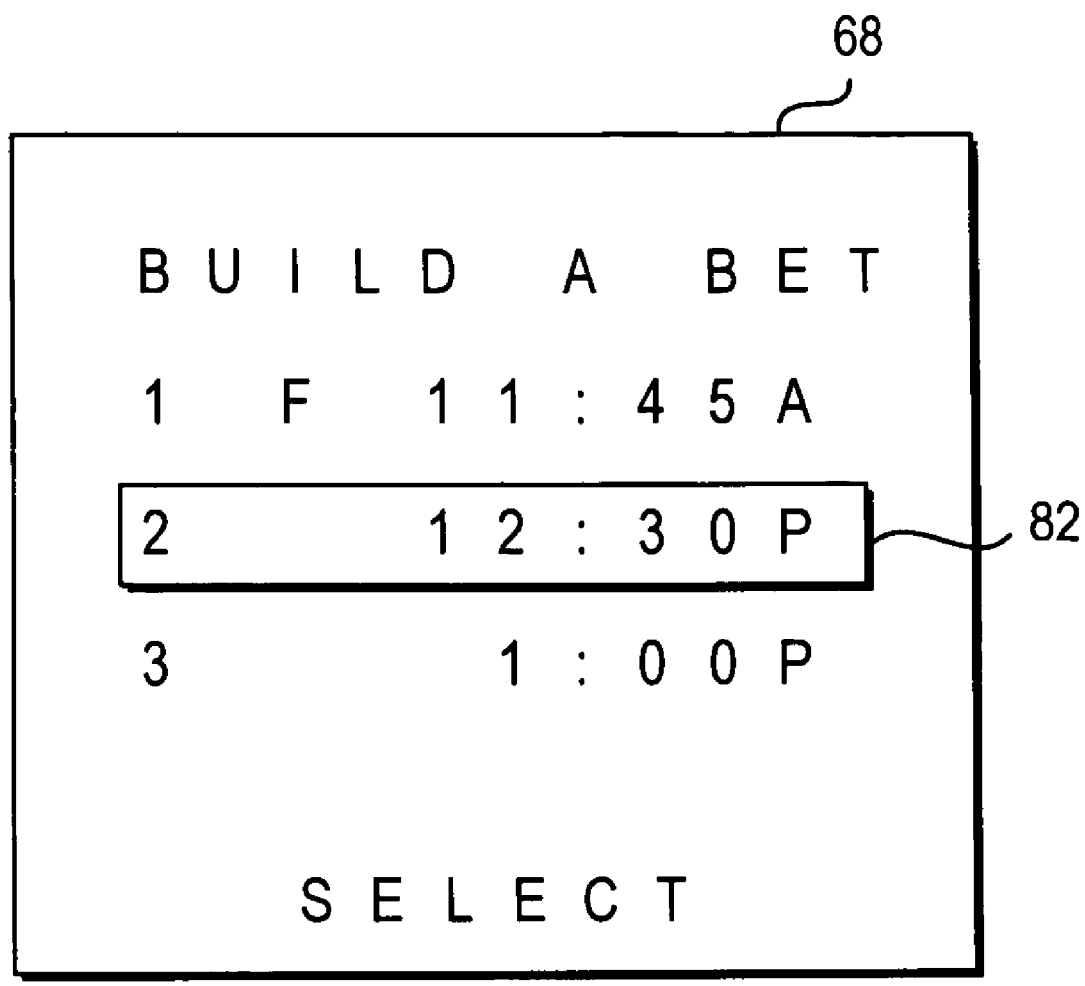
FIG. 8 is an illustrative race selection screen that may be provided by the cellular telephone in accordance with the present invention.
Figure 9:
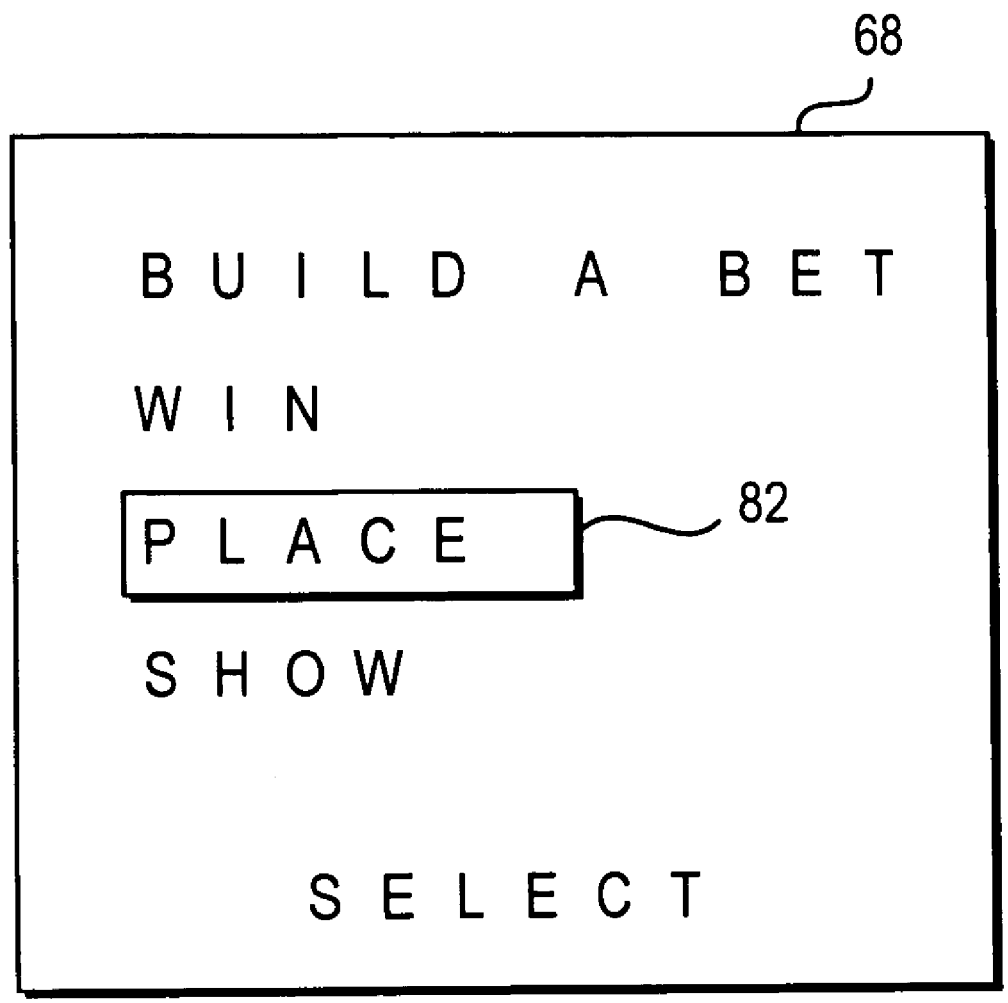
FIG. 9 is an illustrative wager type selection screen that may be provided by the cellular telephone in accordance with the present invention.

Selecting the option for the track "Aqueduct" in the menu screen of FIG. 7 may direct the telephone 46 to display information on the races scheduled to take place at the Aqueduct racetrack, as shown in FIG. 8. If desired, information on the scheduled post times of each race may be provided. In the example of FIG. 8, the user has placed highlight region 82 on top of the option for race 2. Selecting race 2 in FIG. 8 may direct telephone 46 to display screen 68 of FIG. 9, which provides the user with an opportunity to select a desired wager type. In the menu of FIG. 9 and the other menus provided by the telephone, the user may be provided with an opportunity to scroll to menu items beyond the screen borders. Thus, in the example of FIG. 9, the user may scroll to additional wager type options for "exacta," "trifecta," etc. by moving highlight region 82 to the top or bottom of screen 68 and pressing the appropriate scroll key 66. If desired, the user may be provided with an opportunity to scroll off of the screen to the right or left (e.g., to pan to see the end of a long menu item, etc.).

Figure 10:
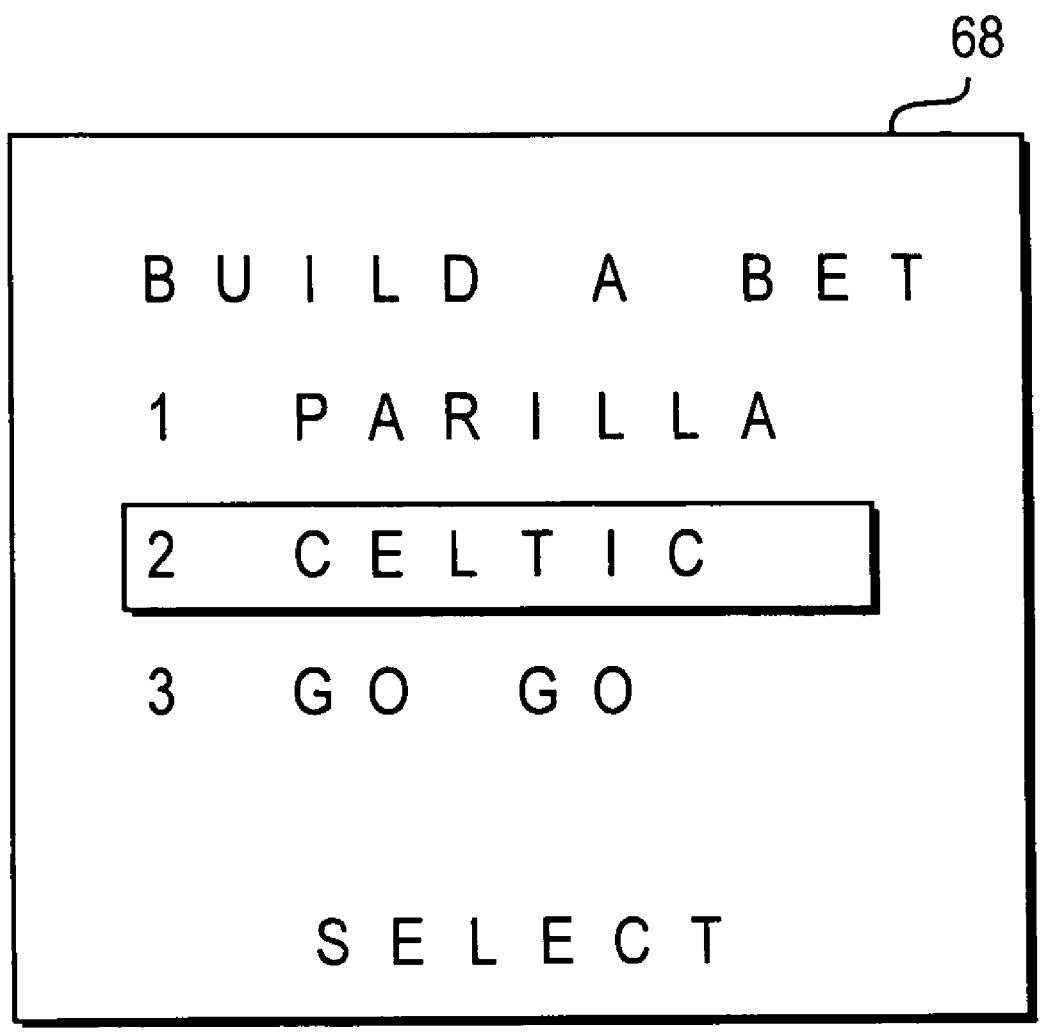
FIG. 10 is an illustrative runner selection screen that may be provided by the cellular telephone in accordance with the present invention.
Figure 11:
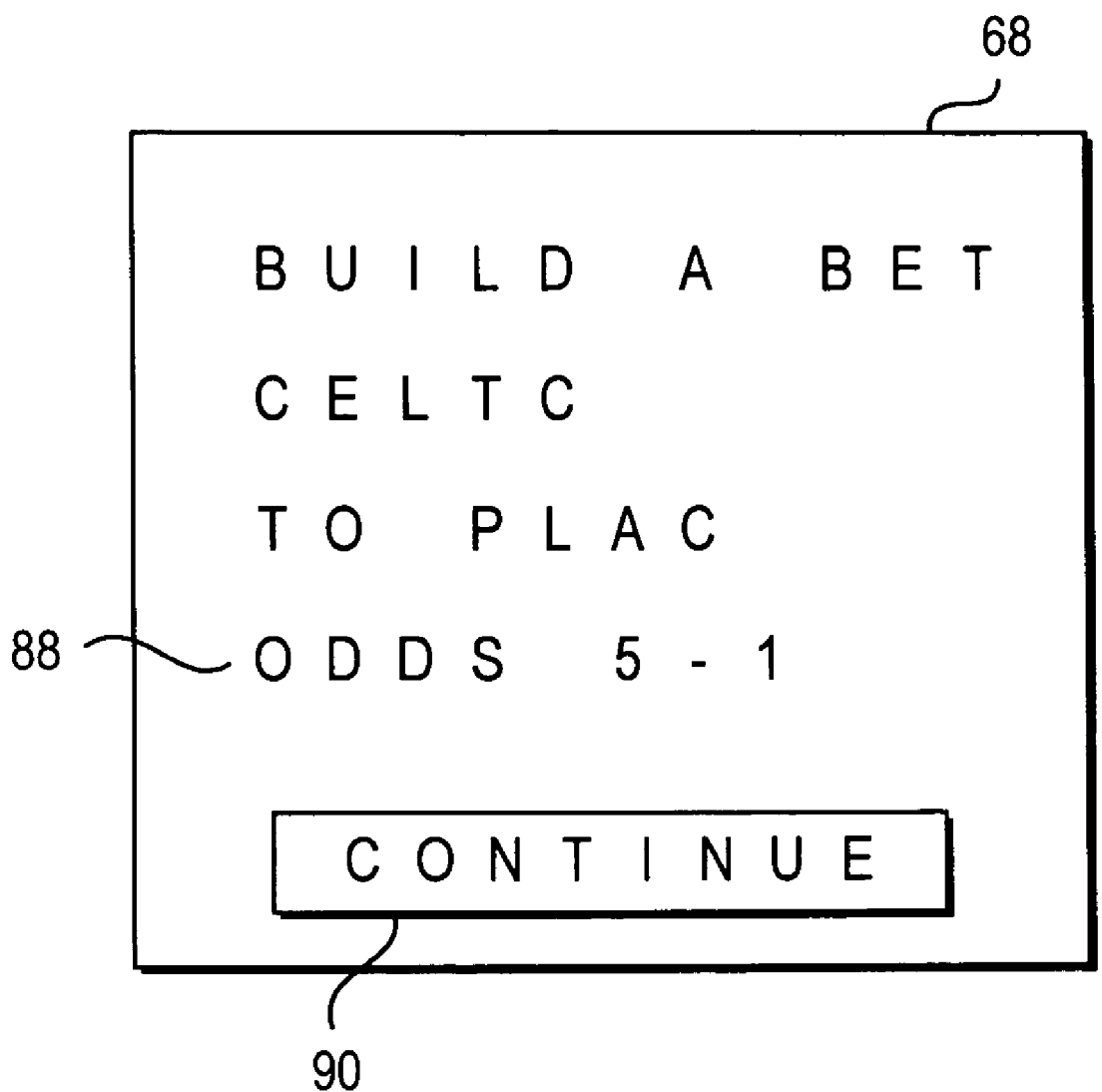
FIG. 11 is an illustrative screen containing real-time racing data and wager confirmation information that may be provided by the cellular telephone in accordance with the present invention.

After the user has selected a wager type, wagering service software running on telephone 46 may provide the user with an opportunity to select a runner for the wager (e.g., a horse or a runner in a harness race or dog race) using screen 68 of FIG. 10. After the runner has been selected, the user may be provided with a screen such as screen 68 of FIG. 11 that confirms the details of the wager that has been built by the user. Screen 68 of FIG. 11 illustrates how the user may be provided with real-time racing data 88 (e.g., the current odds for the horse Celtic to place in race 2 at the Aqueduct track at 12:30 PM). If desired, racing data (either real-time racing data, statistical racing data or both) may be accessed through other suitable menus or options. For example, the user may obtain handicapping data by selecting an option such as handicap menu option 84 of FIG. 6. These arrangements are merely illustrative. Any suitable options may be displayed on display 56 of FIG. 2 to provide the user with an opportunity to access racing data and view the racing data on display 56.

Figure 12:
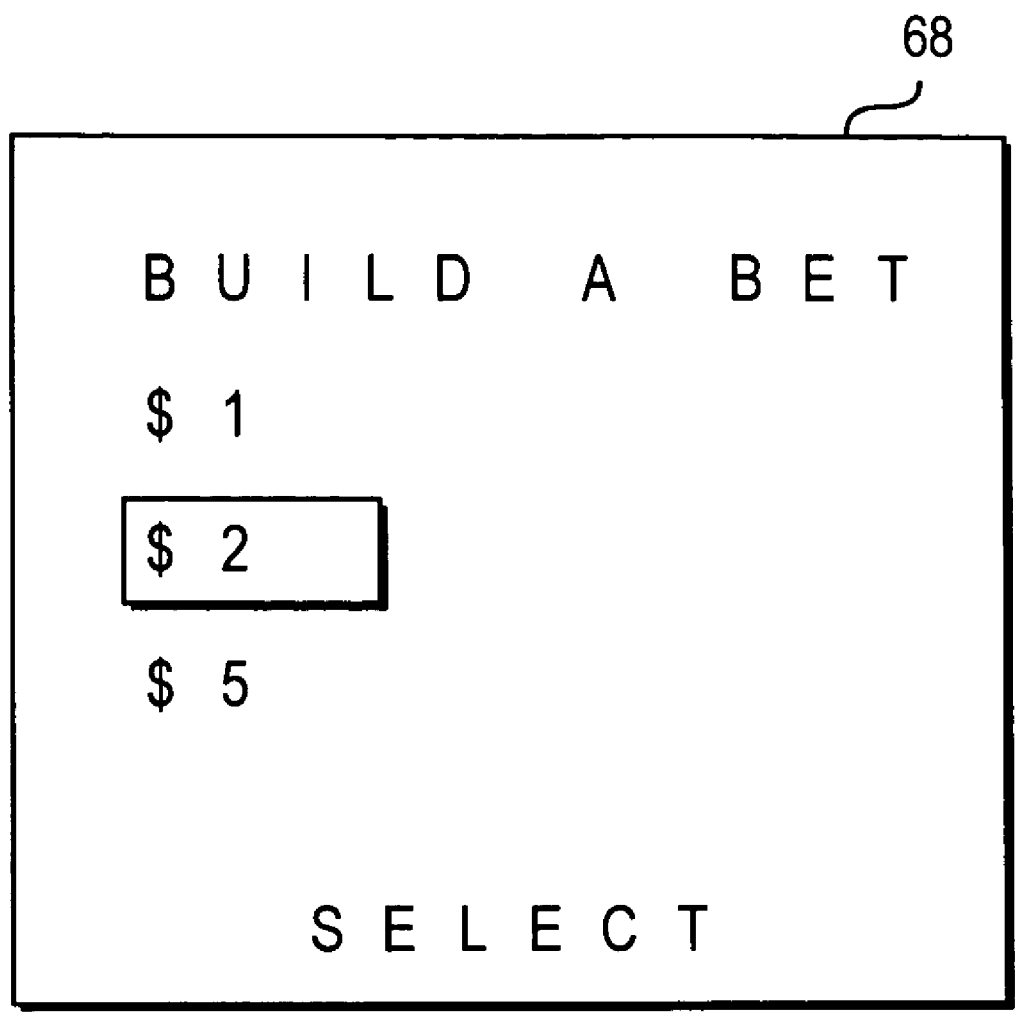
FIG. 12 is an illustrative wager amount selection screen that may be provided by the cellular telephone in accordance with the present invention.

If the user selects continue option 90 of FIG. 11, the user may be presented with a screen such as screen 68 of FIG. 12 in which the user is provided with an opportunity to select a wager amount. After selecting a desired wager amount, the user may be presented with a screen such as screen 68 of FIG. 13. Screen 68 of FIG. 13 may include wager confirmation information 92 on the details of the current wager that the user has just created. Screen 68 of FIG. 13 may also include various options 94. For example, an option such as option 94*a* may be used to provide the user with an opportunity to create a new wager. An option such as option 94*b* may be used to provide the user with an opportunity to send the current wager to transaction processing and subscription management system 24. An option such as option 94*c* may be used to provide the user with an opportunity to delete the current wager. These options are merely illustrative. Various other suitable arrangement may be used to provide the user with wager management functions if desired.

Figure 13:
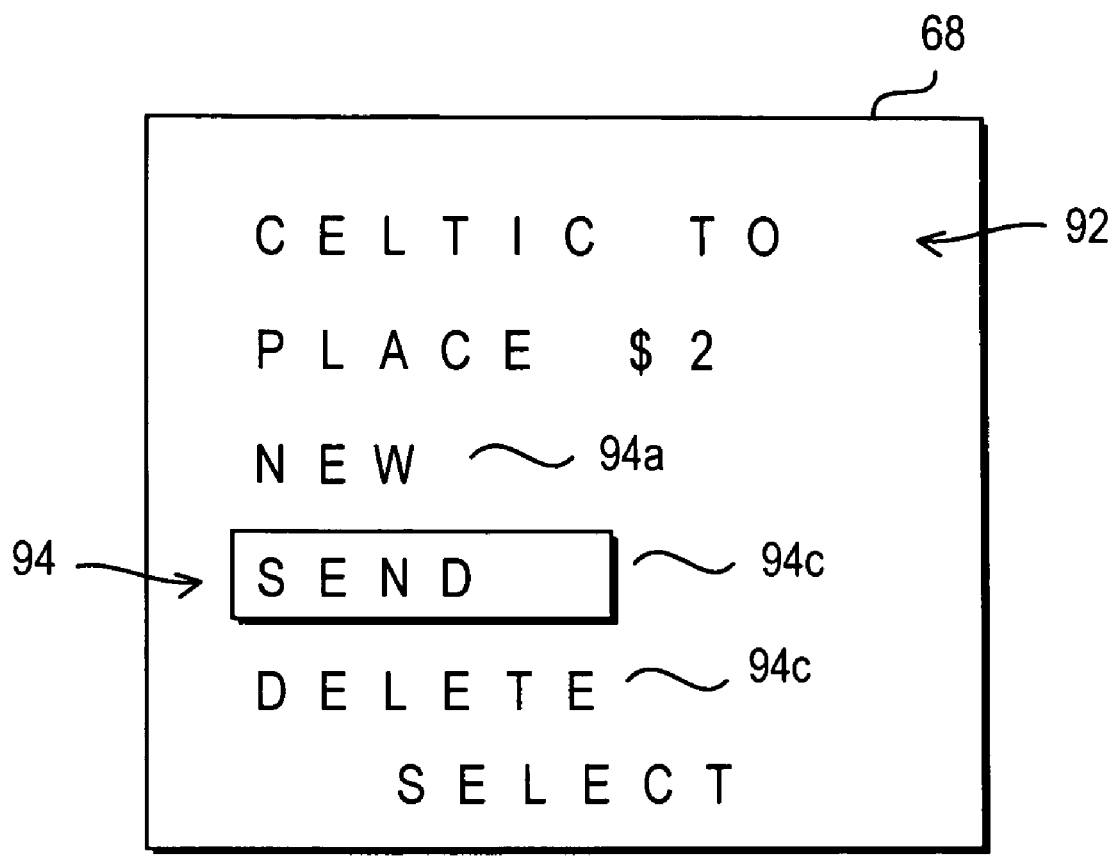
FIG. 13 is an illustrative screen that may be provided by the cellular telephone to provide the user with an opportunity to create a new wager, submit the current wager, or delete the current wager in accordance with the present invention.
Figure 14:
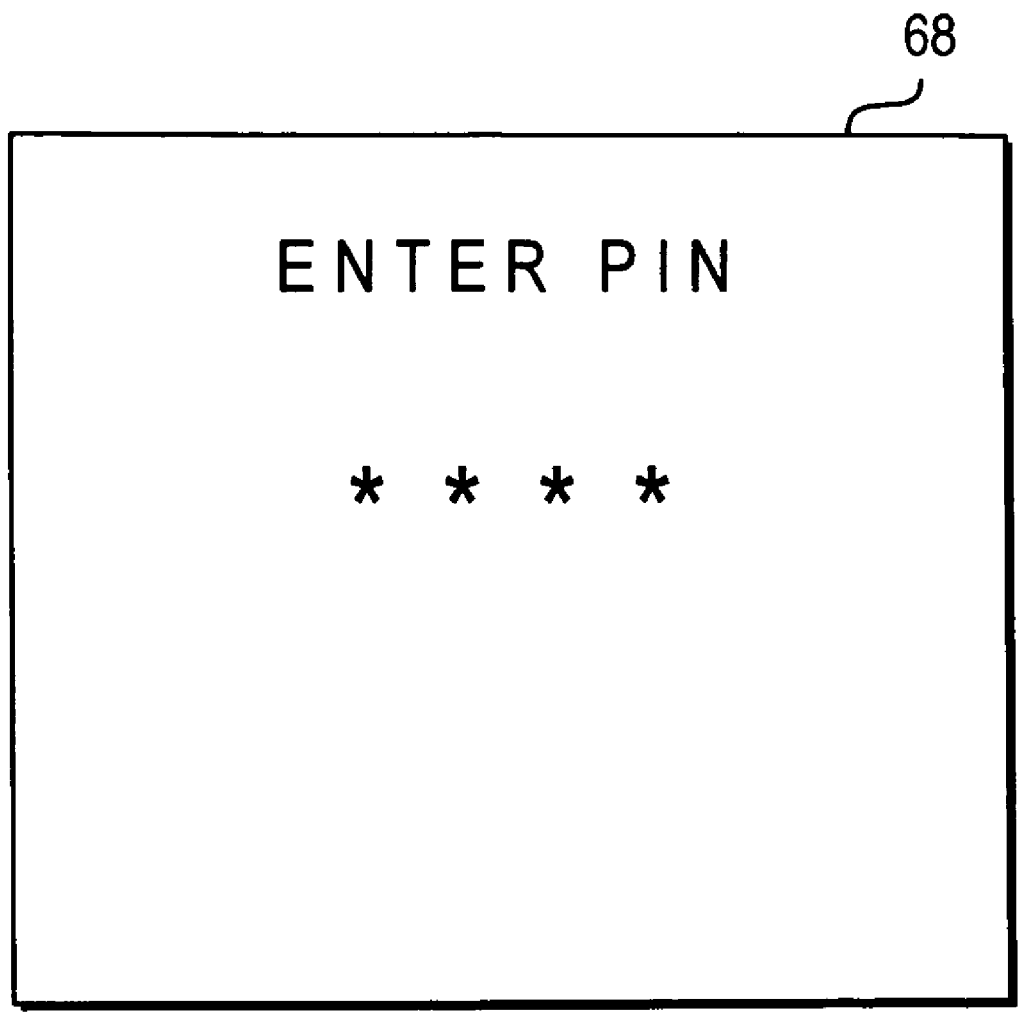
FIG. 14 is an illustrative screen that may be provided by the cellular telephone to authenticate a user's identity using a personal identification number in accordance with the present invention.

If the user selects send option 94*b* of FIG. 13, the user may be presented with a screen such as screen 68 of FIG. 14. Screen 68 of FIG. 14 provides the user with an opportunity to enter a personal identification number (PIN). The PIN, which may be established during the enrollment process, may be used as a security feature to prevent unauthorized parties from placing wagers. PIN validation may be one-step or multi-step process, and may involve local authorization steps (implemented locally on the cellular telephone) and remote authorization steps (implemented using transaction processing and subscription management system 24 or other suitable equipment).

If the PIN entered using screen 68 of FIG. 14 is valid, the user's wager is processed. For example, the wager may be accepted by transaction processing and subscription management system 24 and passed to the totalisator 30 at which the user has an account. When the race on which the wager was placed has been run, the totalisator 30 adjusts the user's account balance accordingly. The totalisator 30 may update the user's account status at transaction processing and subscription management system 24 using an end-of-day report or other suitable arrangement.

Figure 15:
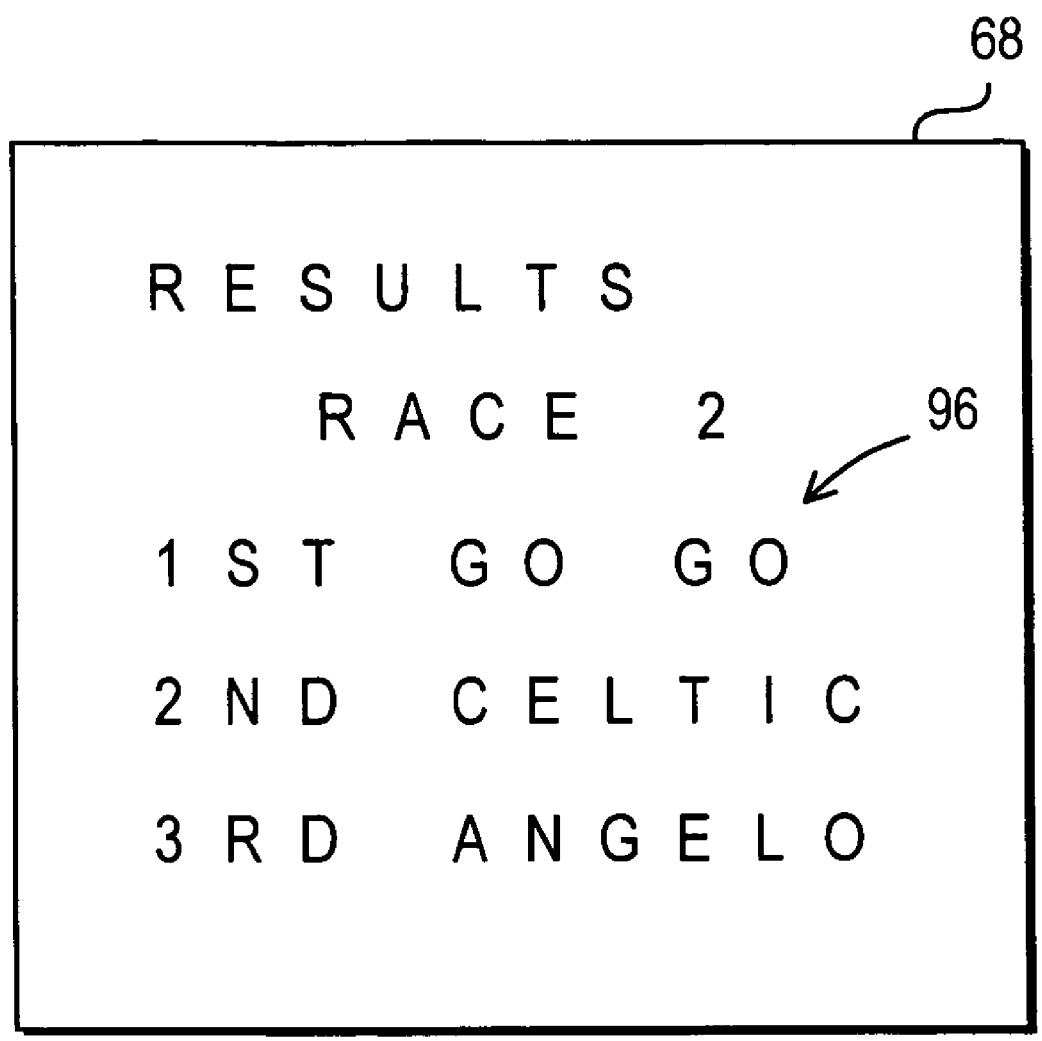
FIG. 15 is an illustrative race results screen that may be provided by the cellular telephone in accordance with the present invention.

The user may view race results on display 56 of FIG. 2 using any suitable visual display arrangement. An example is shown in FIG. 15. In screen 68 of FIG. 15, the user is provided with information 96 on the top three finishers in race 2. Race results may include payoffs for a standard wager for win, place, and show wagers. Race results may also include payoff information for other wager types such as exactas, trifectas, daily doubles, pick three, pick four, etc. This information is merely illustrative. Any suitable race results information may be provided if desired. The user may be provided with options to access race results for various tracks, races, runners, etc. Race results may include text, graphics, or video (e.g., race videos).

Information on race results may be provided to cellular telephone 46 as a real-time data stream, in a periodic data stream, or on-demand, when requested by telephone 46. Results may be provided using any suitable data format, such as e-mail, modem transmissions, paging or other messages, Internet-type communications, etc.

Figure 16:
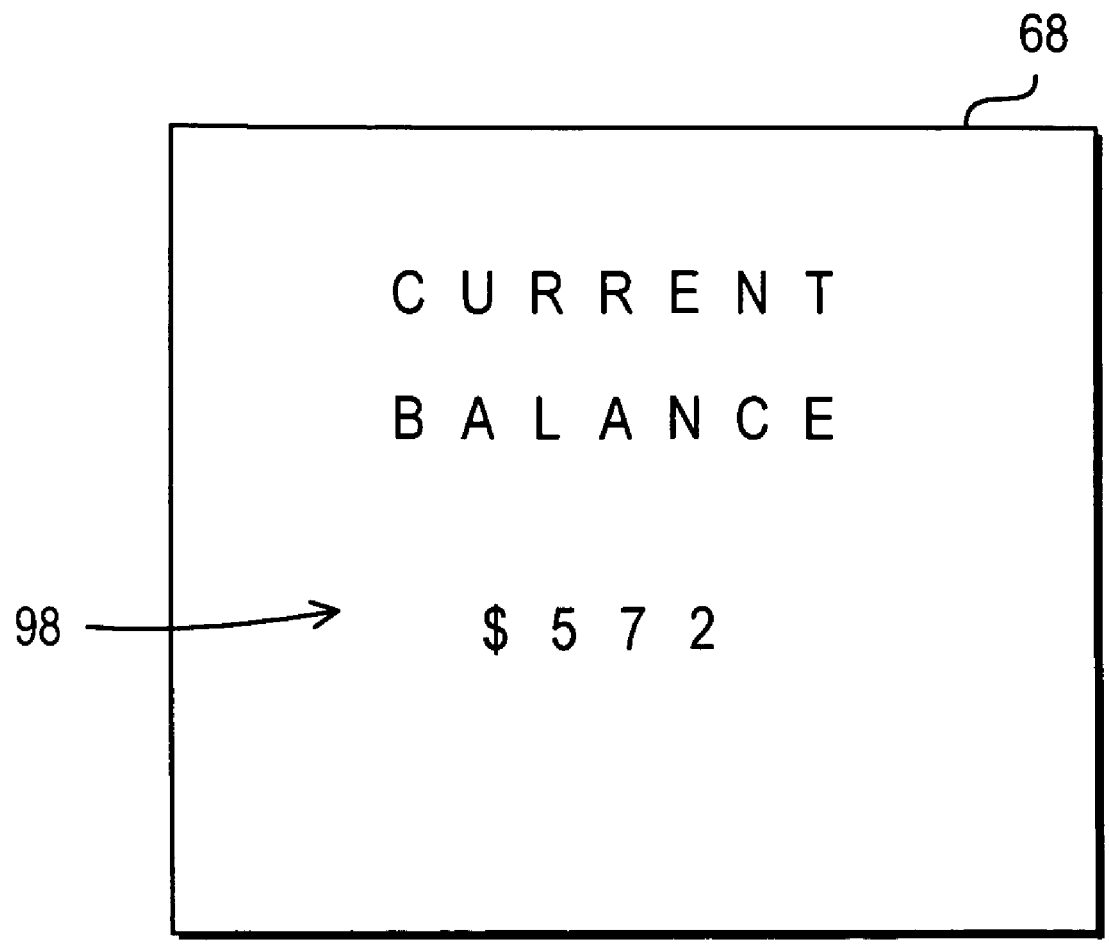
FIG. 16 is an illustrative account balance screen that may be provided by the cellular telephone in accordance with the present invention.

As shown in FIG. 16, the user may be provided with a screen such as screen 68 when the user requests account balance information 98. Account balance inquiries may be handled by the totalisator 30 at which the user maintains an account, by transaction processing and subscription management system 24, or bu any other suitable facility.

Figure 17:
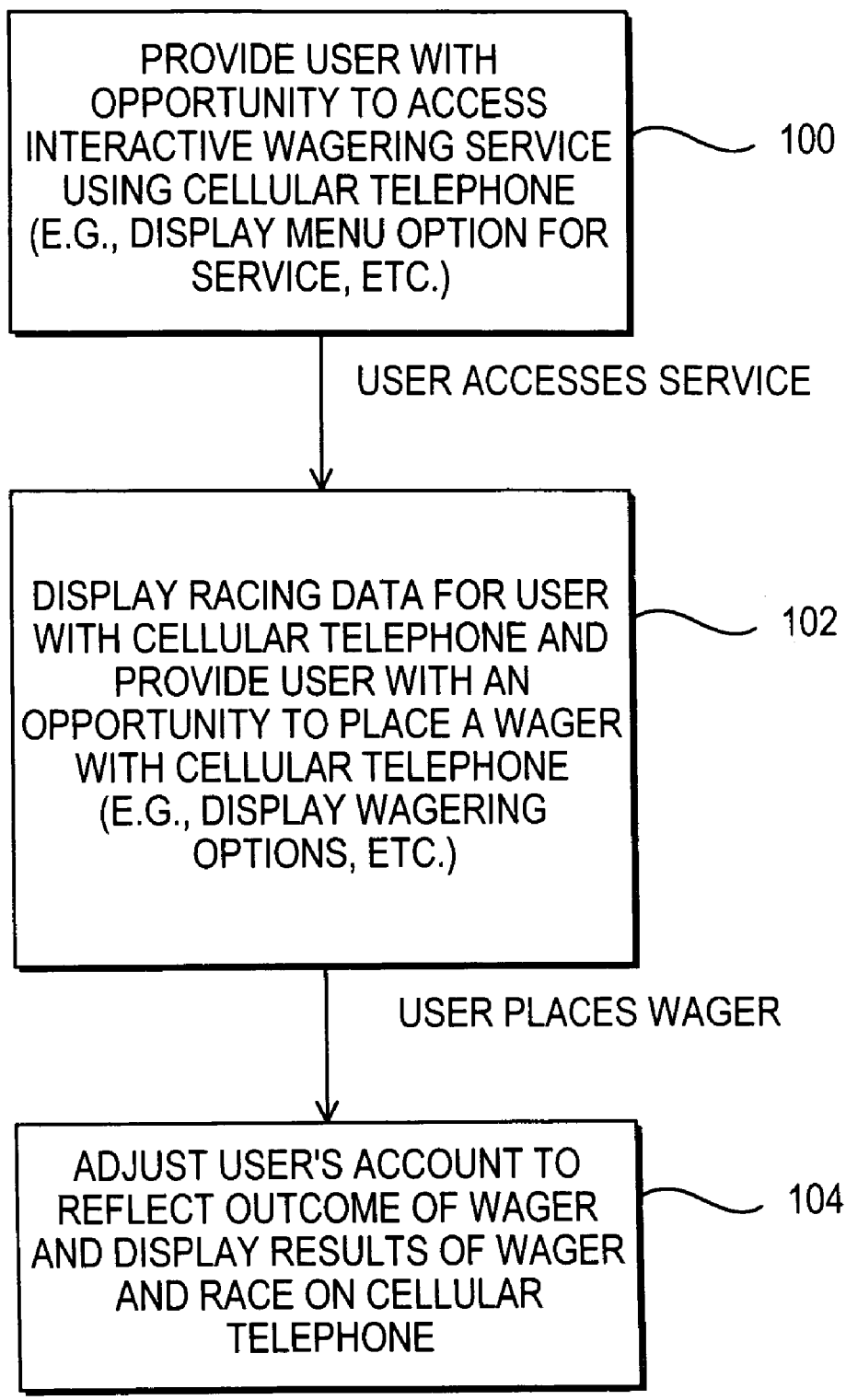
FIG. 17 is a flow chart of illustrative steps involved in using the interactive wagering service with the cellular telephone in accordance with the present invention.

Steps involved in using the cellular telephone wagering service are shown in FIG. 17. At step 100, the user may be provided with an opportunity to access the interactive wagering service using a cellular telephone such as telephone 46 of FIG. 1. For example, the telephone may be used to display options (see, e.g., screen 68 of FIG. 5) that allow the user to view various interactive wagering screens.

Racing data may be displayed for the user on a display such as display 56 of FIG. 2 at step 102. Racing data may be displayed as text, graphics, and video (with or without audio). Racing data may include historical racing data (i.e., statistical racing data such as handicapping information), real-time data (e.g., current odds) or any other suitable racing data. The user may also be provided with an opportunity to place a wager with the cellular telephone at step 102. For example, the user may be provided with an opportunity to select tracks, races, wager types, runners, wager amounts, etc. from options displayed on display 56.

At step 104, the user's account may be adjusted to reflect the outcome of any wagers that the user may have placed and to display the race results on the cellular telephone. Race results may include the name of the runner, the amount wagered, the payoff amount and other such wager results, etc. Race results may also include the position of the runners and other such information. Race results may be provided in real time or may be provided later, after the race has finished.

Figure 18:
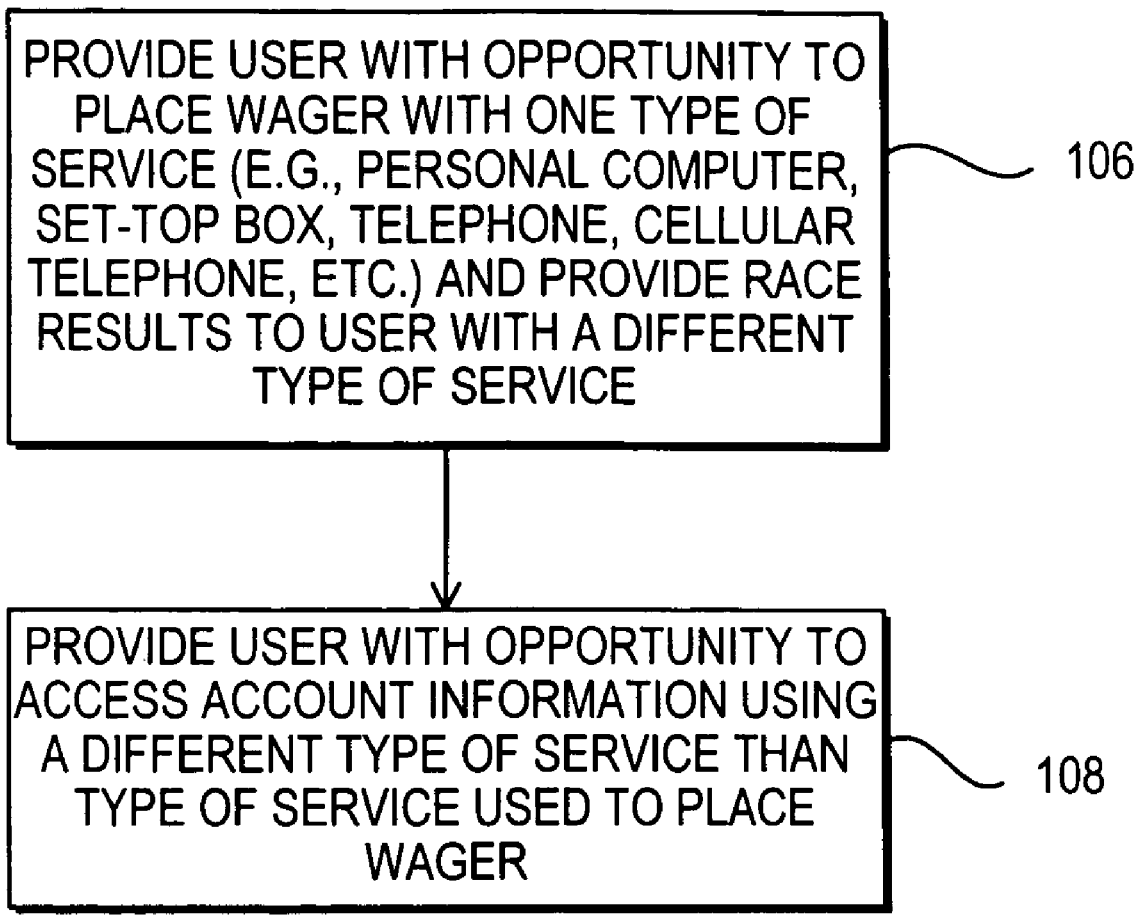
FIG. 18 is a flow chart of illustrative steps involved in using a different platform to access the user's account information than was used to place a wager in accordance with the present invention.

Wagers may be placed using one platform and race results viewed using another platform. For example, wagers may be placed using a set-top box, a personal computer, or a non-cellular telephone and race results may be presented to the user at a cellular telephone such as cellular telephone 46 or a handheld computing device. This is illustrated as step 106 of FIG. 18. Account information may also be accessed using cross-platform arrangements (see step 108). These examples are merely illustrative, and any suitable cross-platform display of race results may be made if desired.

The user may set a reminder for a race. This allows the user to be alerted when the race is about to take place, so that the user does not miss the race. Reminders may be set and executed on the same platform. If desired, reminders may be set using one platform and executed on another platform. For example, the user may wish to place a wager for a particular race using cellular telephone 46 when the user is on the road. Later, when the user is at home and has access to television equipment, the user may be sent an e-mail reminder that the desired race is about to begin. E-mail reminders or other suitable reminder messages or commands to display reminders may be sent to user television equipment 22 or user computer equipment 20. A reminder may be presented to the user at user television equipment 22 by displaying a reminder overlay on top of the video for a television program to which the user is currently tuned. A reminder may be presented to the user at user computer equipment 20 (e.g., a personal computer) by displaying the reminder message in the user's e-mail "in box."

Figure 19:
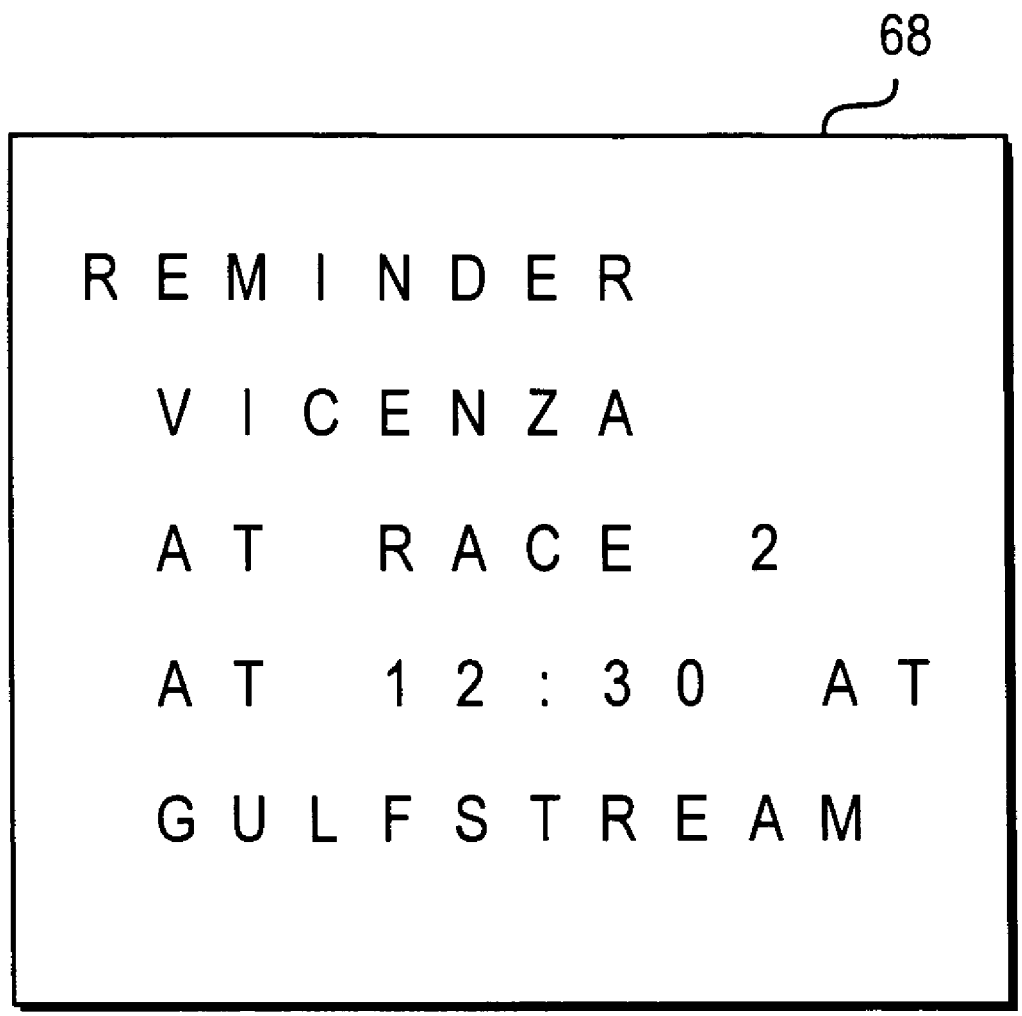
FIG. 19 is an illustrative reminder that may be displayed on a cellular telephone display in accordance with the present invention.

Any suitable technique for setting a reminder may be used. For example, the user may be provided with a prompt or option on screen 56 of FIG. 2 when the user places a wager. The prompt may ask the user whether the user wishes to set a reminder. If the user sets a reminder, a reminder may be displayed for the user just before the race begins (e.g., 5-10 minutes before the scheduled race time or other suitable interval). An illustrative reminder is shown in FIG. 19. In the example of FIG. 19, the user has set a reminder for the horse "Vicenza." Vicenza is scheduled to run in race 2 at 12:30 PM at the Gulfstream track. Telephone 46 may display a reminder screen such as screen 68 of FIG. 19 at the appropriate time to remind the user of the event. The user may be provided with reminders or reminded of their presence by e-mail, paging messages, other alphanumeric messages, pop-up messages or icons, audible tones, etc. If desired, the system may use automatic dialing equipment located at transaction processing and subscription management system 24 or other suitable location to place a telephone call to the user's cellular telephone and provide an audio reminder message. The audio reminder message may serve as the user's only reminder or may serve as a notification for the user of the presence of a more detailed reminder. The audio reminder message may be provided using voice synthesizing equipment or by playing back a recorded reminder message for the user. The reminder message may be a voice mail message recorded by the user when setting the reminder.

Figure 20:
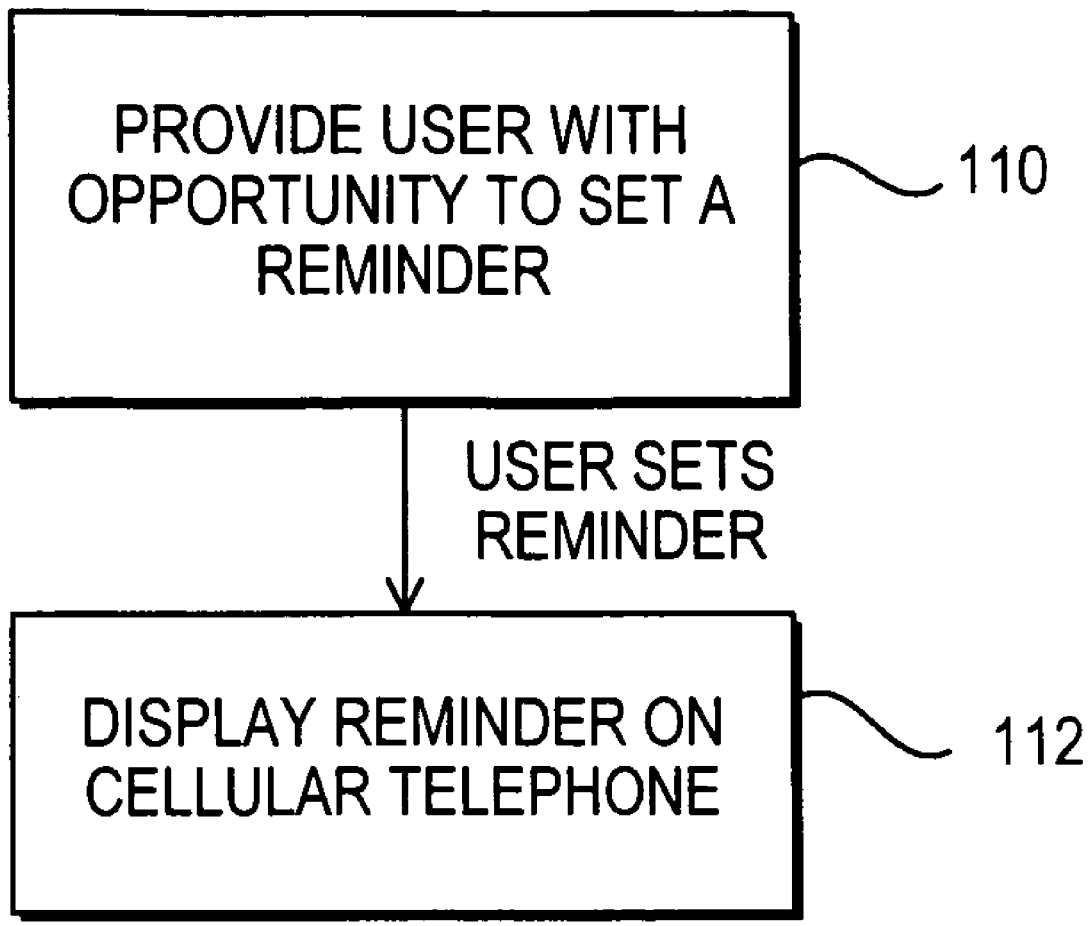
FIG. 20 is a flow chart of illustrative steps involved in using reminders with the cellular telephone in accordance with the present invention.

Steps involved in providing users with reminders are displayed in FIG. 20. At step 110, the user may be provided with an opportunity to set a reminder. The user may set the reminder by interacting with options displayed on a screen such as screen 56 of FIG. 2 by interacting with an interactive voice response system located at transaction processing and subscription management system 24, by speaking with a customer service representative at facility 36 who sets the reminder, or any other suitable technique. At step 112, the reminder may be used to alert the user of the upcoming event. For example, as shown at step 112 of FIG. 20, reminders may be displayed on a screen such as screen 56 of FIG. 2. Reminders to be made using one platform may be set using a different platform. For example, reminders set using user television equipment 22, user computer equipment 20, or a non-cellular telephone may be presented to the user at a cellular telephone such as cellular telephone 56 or a handheld computing device. These examples are merely illustrative. If desired, reminders may be set and executed using any suitable cross-platform arrangement.

The cellular telephone may be used to interactively order merchandise (e.g., merchandise related to the wagering service). The cellular telephone may also be used to present advertising to the user (e.g., advertising targeted to the user based on the user's monitored behavior). The foregoing examples are not exhaustive of the types of features that may be provided by the interactive wagering service using the cellular telephone. Any other wagering service features may be provided if desired.

Although the present invention has been described primarily in the context of cellular telephones, certain aspects of the invention also apply to handheld computing devices or other wireless devices. An advantage of cellular telephones over wireless handheld computing devices is that cellular telephones are optimized for cellular telephone voice communications. An advantage of handheld computing devices is that they may have better display capabilities than some cellular telephones.

Figure 21:
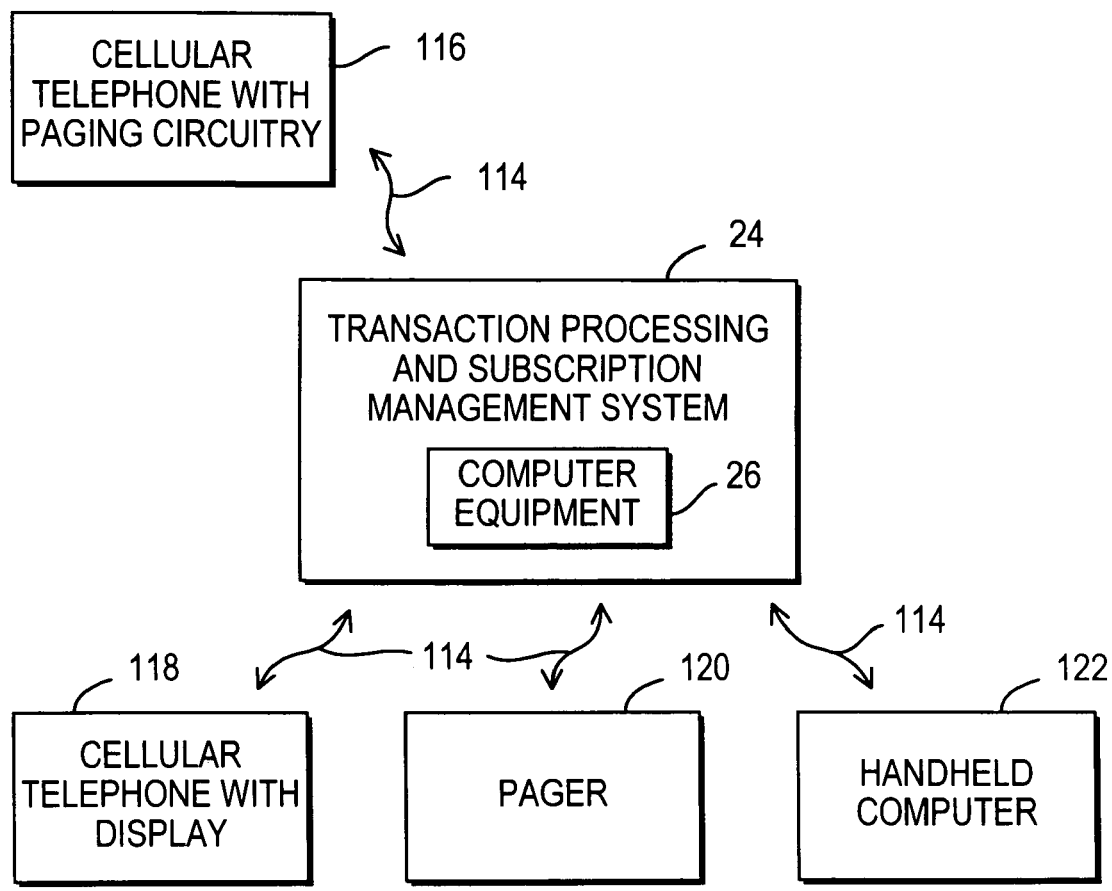
FIG. 21 is a diagram showing some of the illustrative handheld devices that may be used to interact with the interactive wagering system in accordance with the present invention.

Some of the illustrative wireless devices that may be used to interact with the interactive wagering system are shown in FIG. 21. Transaction processing and subscription management system 24 may provide racing data such as handicapping data and race results and reminders over a wireless links 114. Users may place wagers from the wireless devices over wireless links. Wireless links 114 may use any suitable communications scheme. For example, wireless links 114 may involve use of paging transmissions over paging frequencies in the 900 MHZ band.

Devices such as a cellular telephone with paging circuitry 116, a cellular telephone with a display 118, a pager 120, and a handheld computer 122 may be used to interact with computer equipment 26 of transaction processing and subscription management system 24. Wireless devices such as the devices shown in FIG. 21 may be used to review handicapping information, may be used to obtain information on tracks and races, and may be used to create and place wagers. These wireless devices may also be used to receive reminders such as reminders for upcoming races.

The foregoing is merely illustrative of the principles of this invention and various modifications can be made by those skilled in the art without departing from the scope and spirit of the invention.

What is claimed is:

1. A method for interactive wagering on races with a cellular telephone comprising:
    receiving at the cellular telephone racing data on races that have not been run and that a user is allowed to place wagers on;
    after receiving the racing data, allowing the user to select to present the received racing data in audio form or visual form;
    presenting the racing data on the races that have not been run and that the user is allowed to place wagers on using the cellular telephone based on the user selection; and
    providing interactive options on the cellular telephone that allow the user to place a wager on a given race that has not been run using the cellular telephone.

2. The method defined in claim 1 further comprising providing racing data to the cellular telephone from a transaction processing and subscription management system for display on the cellular telephone.

3. The method defined in claim 1 further comprising displaying interactive options on the cellular telephone that provide the user with an opportunity to initiate access to the interactive wagering service.

4. The method defined in claim 1 further comprising displaying an interactive option on the cellular telephone that provides the user with an opportunity to initiate creation of a wager.

5. The method defined in claim 1 further comprising displaying an interactive option on the cellular telephone that provides the user with an opportunity to display race results.

6. The method defined in claim 1 further comprising displaying an interactive option on the cellular telephone that provides the user with an opportunity to view handicapping information on the cellular telephone.

7. The method defined in claim 1 further comprising displaying an interactive option on the cellular telephone that provides the user with an opportunity to select the racetrack for the given race.

8. The method defined in claim 1 further comprising displaying an interactive option on the cellular telephone that provides the user with an opportunity to select the given race from a plurality of races at a plurality of racetracks.

9. The method defined in claim 1 further comprising displaying an interactive option on the cellular telephone that provides the user with an opportunity to select a desired wager type for the wager.

10. The method defined in claim 1 further comprising displaying an interactive option on the cellular telephone that provides the user with an opportunity to select a horse on which to wager for the given race.

11. The method defined in claim 1 further comprising displaying current odds for the wager on the cellular telephone in real time before the wager is placed.

12. The method defined in claim 1 further comprising displaying an interactive option on the cellular telephone that provides the user with an opportunity to select a wager amount for the wager.

13. The method defined in claim 1 further comprising displaying an interactive option on the cellular telephone that provides the user with an opportunity to create a new wager after the wager has been created.

14. The method defined in claim 1 further comprising displaying an interactive option on the cellular telephone that provides the user with an opportunity to place the wager by wirelessly sending the wager to a transaction processing and subscription management system.

15. The method defined in claim 1 further comprising displaying an interactive option on the cellular telephone that provides the user with an opportunity to delete a wager after the wager has been created.

16. The method defined in claim 1 further comprising displaying an interactive option on the cellular telephone that provides the user with an opportunity to enter a personal identification number to ensure that the user is authorized to place the wager.

17. The method defined in claim 1 further comprising using the cellular telephone to provide the user with an opportunity to request account balance information from a totalisator.

18. The method defined in claim 1 further comprising using user television equipment to view race results for the given race on which the wager was placed.

19. The method defined in claim 1 further comprising using user computer equipment to view race results for the given race on which the wager was placed.

20. The method defined in claim 1 wherein receiving at the cellular telephone racing data on races that have not been run and that the user is allowed to place wagers on comprises using a wireless data link to receive racing data from a transaction processing and subscription management system.

21. The method defined in claim 1 wherein receiving at the cellular telephone racing data on races that have not been run and that the user is allowed to place wagers on comprises using a wireless data link to receive racing data from a transaction processing and subscription management system, wherein the transaction processing and subscription management system receives the racing data from a racing data collection and processing system.

22. The method defined in claim 1 wherein receiving at the cellular telephone racing data on races that have not been run and that the user is allowed to place wagers on comprises using a wireless data link to receive racing data from a transaction processing and subscription management system, wherein the transaction processing and subscription management system receives the racing data from a totalisator.

23. The method defined in claim 1 further comprising adjusting an account of the user to reflect the outcome of the wager.

24. The method defined in claim 1 further comprising adjusting an account of the user to reflect the outcome of the wager and displaying results from the wager on the cellular telephone.

25. The method defined in claim 1 further comprising providing the user with an opportunity to set a reminder for the given race with the cellular telephone.

26. The method defined in claim 1 further comprising providing the user with a reminder for the given race with the cellular telephone.

27. The method defined in claim 1 further comprising displaying a reminder for the race for the user with the cellular telephone.

28. The method defined in claim 1 further comprising reminding the user of the given race by using automatic dialing equipment to place a telephone call to the cellular telephone and providing an audio reminder message.

29. The method defined in claim 1 further comprising providing video for the given race to the cellular telephone.

30. The method defined in claim 1 further comprising:
providing the user with an opportunity to set a reminder for the given race using the cellular telephone; and
displaying the reminder for the given race on user television equipment.

31. The method defined in claim 1 further comprising:
providing the user with an opportunity to set a reminder for the given race using the cellular telephone; and
presenting the reminder for the given race to the user at a personal computer.

32. A system for interactive wagering comprising:
a transaction processing and subscription management system for handling wagers on races; and
a cellular telephone that is in wireless communication with the transaction processing and subscription management system and that has a display, wherein the cellular telephone is configured to:
receive racing data on races that have not been run and that a user is allowed to place wagers on;
after receiving the racing data, allow the user to select to present the received racing data in audio form or visual form;
present the racing data on the races that have not been run and that the user is allowed to place wagers on using the cellular telephone based on the user selection; and
provide interactive options on the cellular telephone that allow the user to place a wager on a given race that has not been run.

33. The system defined in claim 32 wherein the cellular telephone is configured to receive information on the results of the given race from the transaction processing and subscription management system and is configured to display the results of the given race on the display.

34. The system defined in claim 32 wherein the cellular telephone is configured to receive information on current odds for the given race from the transaction processing and subscription management system before the given race has been run and is configured to display the information on the current odds on the display.

35. A system for interactive wagering comprising:
a transaction processing and subscription management system for handling wagers on races that have not been run and that a user is allowed to place wagers on;
equipment selected from the group consisting of: user television equipment, user computer equipment, and non-cellular telephone equipment, wherein the equipment is configured to access racing data at the transaction processing and subscription management system and to provide information on wagering data to the transaction processing and subscription management system; and a cellular telephone that receives racing data on races that have not been run and that the user is allowed to place wagers on from the transaction processing and subscription management system and provides wagering data to the transaction processing and subscription management system and that has a display, wherein the cellular telephone is configured to:
  after receiving the racing data, allow the user to select to present the received racing data in audio form or visual form;
  present the racing data on the races that have not been run and that the user is allowed to place wagers on using the cellular telephone based on the user selection; and
  provide interactive options on the cellular telephone that allow the user to place a wager on a given race that has not been run using the cellular telephone, and wherein the equipment is configured to display information on race results for the given race after the given race has been run.

36. A system for interactive wagering comprising:
a transaction processing and subscription management system for handling wagers on races that have not been run and that a user is allowed to place wagers on;
equipment selected from the group consisting of: user television equipment, user computer equipment, and non-cellular telephone equipment, wherein the equipment is configured to access racing data at the transaction processing and subscription management system to provide information on wagers to the transaction processing and subscription management system; and
a cellular telephone that receives racing data on races that have not been run and that the user is allowed to place wagers on from the transaction processing and subscription management system and provides wagering data to the transaction processing and subscription management system and that has a display, wherein the equipment is configured to allow a user to interact with options to place a wager on a given race that has not been run, and wherein the cellular telephone is configured to:
  after receiving the racing data, allow the user to select to present the received racing data in audio form or visual form; and
  present information on race results for the given race based on the user selection after the given race has been run.

37. A cellular telephone interactive wagering system comprising:
  computer equipment that handles wagers; and
  a cellular telephone having a display, wherein the cellular telephone is configured to:
    receive racing data on races that have not been run and that a user is allowed to place wagers on;
    after receiving the racing data, allow the user to select to present the received racing data in audio form or visual form;
    present the racing data on the races that have not been run and that the user is allowed to place wagers on using the cellular telephone based on the user selection; and
    provide interactive options on the cellular telephone that allow the user to place a wager on a given race that has not been run, and wherein wagering data for the wager is transmitted from the cellular telephone to the computer equipment.

38. The system defined in claim 37 wherein the cellular telephone is further configured to receive information on results of the wager and to display the information on the results of the wager on the display.

39. The system defined in claim 37 wherein the computer equipment is part of a transaction processing and subscriber management system.

40. A system for interactive wagering comprising:
a transaction processing and subscription management system for handling wagers on races that have not been run and that a user is allowed to place wagers on;
equipment selected from the group consisting of: user television equipment, user computer equipment, and non-cellular telephone equipment, wherein the equipment is configured to access racing data at the transaction processing and subscription management system and to provide information on wagering data to the transaction processing and subscription management system; and
a cellular telephone that receives racing data on races that have not been run from the transaction processing and subscription management system and provides wagering data to the transaction processing and subscription management system and that has a display, wherein the equipment is configured to allow a user to interact with options to place a wager on a given race that has not been run, and wherein the cellular telephone is configured to:
  after receiving the racing data, allow the user to select to present the received racing data in audio form or visual form;
  present the racing data on the races that have not been run and that the user is allowed to place wagers on using the cellular telephone based on the user selection; and
  display account balance information for the user.

41. A computer-readable medium for use in interactive wagering on races that is implemented using a cellular telephone comprising computer program logic recorded thereon for:
  receiving at the cellular telephone racing data on races that have not been run and that a user is allowed to place wagers on;
  after receiving the racing data, allowing the user to select to present the received racing data in audio form or visual form;
  presenting the racing data on the races that have not been run and that the user is allowed to place wagers on using the cellular telephone based on the user selection; and
  providing interactive options on the cellular telephone that allow the user to place a wager on a given race that has not been run using the cellular telephone.

42. The computer-readable medium defined in claim 41 further comprising computer program logic recorded thereon for providing racing data to the cellular telephone from a transaction processing and subscription management system for display on the cellular telephone.

43. The computer-readable medium defined in claim 41 further comprising computer program logic recorded thereon for displaying interactive options on the cellular telephone that provide the user with an opportunity to initiate access to the interactive wagering service.

44. The computer-readable medium defined in claim 41 further comprising computer program logic recorded thereon for displaying an interactive option on the cellular telephone that provides the user with an opportunity to initiate creation of a wager.

45. The computer-readable medium defined in claim 41 further comprising computer program logic recorded thereon for displaying an interactive option on the cellular telephone that provides the user with an opportunity to display race results.

46. The computer-readable medium defined in claim 41 further comprising computer program logic recorded thereon for displaying an interactive option on the cellular telephone that provides the user with an opportunity to view handicapping information on the cellular telephone.

47. The computer-readable medium defined in claim 41 further comprising computer program logic recorded thereon for displaying an interactive option on the cellular telephone that provides the user with an opportunity to select the racetrack for the given race.

48. The computer-readable medium defined in claim 41 further comprising computer program logic recorded thereon for displaying an interactive option on the cellular telephone that provides the user with an opportunity to select the given race from a plurality of races at a plurality of racetracks.

49. The computer-readable medium defined in claim 41 further comprising computer program logic recorded thereon for displaying an interactive option on the cellular telephone that provides the user with an opportunity to select a desired wager type for the wager.

50. The computer-readable medium defined in claim 41 further comprising computer program logic recorded thereon for displaying an interactive option on the cellular telephone that provides the user with an opportunity to select a horse on which to wager for the given race.

51. The computer-readable medium defined in claim 41 further comprising computer program logic recorded thereon for displaying current odds for the wager on the cellular telephone in real time before the wager is placed.

52. The computer-readable medium defined in claim 41 further comprising computer program logic recorded thereon for displaying an interactive option on the cellular telephone that provides the user with an opportunity to select a wager amount for the wager.

53. The computer-readable medium defined in claim 41 further comprising computer program logic recorded thereon for displaying an interactive option on the cellular telephone that provides the user with an opportunity to create a new wager after the wager has been created.

54. The computer-readable medium defined in claim 41 further comprising computer program logic recorded thereon for displaying an interactive option on the cellular telephone that provides the user with an opportunity to place the wager by wirelessly sending the wager to a transaction processing and subscription management system.

55. The machine-readable medium defined in claim 41 further comprising computer program logic recorded thereon for displaying an interactive option on the cellular telephone that provides the user with an opportunity to delete a wager after the wager has been created.

56. The computer-readable medium defined in claim 41 further comprising computer program logic recorded thereon for displaying an interactive option on the cellular telephone that provides the user with an opportunity to enter a personal identification number to ensure that the user is authorized to place the wager.

57. The computer-readable medium defined in claim 41 further comprising computer program logic recorded thereon for providing the user with an opportunity to request account balance information from a totalisator.

58. The computer-readable medium defined in claim 41 further comprising computer program logic recorded thereon for viewing race results for the given race on which the wager was placed.

59. The computer-readable medium defined in claim 41 further comprising computer program logic recorded thereon for viewing race results for the given race on which the wager was placed.

60. The computer-readable medium defined in claim 41 further comprising computer program logic recorded thereon for receiving racing data from a transaction processing and subscription management system.

61. The computer-readable medium defined in claim 41 further comprising computer program logic recorded thereon for receiving racing data from a transaction processing and subscription management system, wherein the transaction processing and subscription management system receives the racing data from a racing data collection and processing system.

62. The computer-readable medium defined in claim 41 further comprising computer program logic recorded thereon for receiving racing data from a transaction processing and subscription management system, wherein the transaction processing and subscription management system receives the racing data from a totalisator.

63. The computer-readable medium defined in claim 41 further comprising computer program logic recorded thereon for receiving account information of the user to reflect the outcome of the wager.

64. The computer-readable medium defined in claim 41 further comprising computer program logic recorded thereon for receiving account information of the user to reflect the outcome of the wager and receiving results from the wager on the cellular telephone.

65. The computer-readable medium defined in claim 41 further comprising computer program logic recorded thereon for providing the user with an opportunity to set a reminder for the given race with the cellular telephone.

66. The computer-readable medium defined in claim 41 further comprising computer program logic recorded thereon for providing the user with a reminder for the given race with the cellular telephone.

67. The computer-readable medium defined in claim 41 further comprising computer program logic recorded thereon for displaying a reminder for the race for the user with the cellular telephone.

68. The computer-readable medium defined in claim 41 further comprising computer program logic recorded thereon for providing the user with a reminder for the given race by using automatic dialing equipment to place a telephone call to the cellular telephone and providing an audio reminder message.

69. The machine-readable medium defined in claim 41 further comprising machine program logic recorded thereon for receiving video for the given race to the cellular telephone.

70. The machine-readable medium defined in claim 41 further comprising machine program logic recorded thereon for:

providing the user with an opportunity to set a reminder for the given race using the cellular telephone; and displaying the reminder for the given race on user television equipment.

71. The machine-readable medium defined in claim 41 further comprising machine program logic recorded thereon for:

providing the user with an opportunity to set a reminder for the given race using the cellular telephone; and presenting the reminder for the given race to the user at a personal computer.

* * * * *